(12) United States Patent
Vinson et al.

(10) Patent No.: US 7,096,253 B2
(45) Date of Patent: *Aug. 22, 2006

(54) METHOD AND APPARATUS FOR STREAMING SOFTWARE

(75) Inventors: Jeffrey Vinson, San Jose, CA (US); Steig Westerberg, San Jose, CA (US); Jeffrey DeVries, Sunnyvale, CA (US)

(73) Assignee: Stream Theory, Inc., Irvine, CA (US)

( * ) Notice: Subject to any disclaimer, the term of this patent is extended or adjusted under 35 U.S.C. 154(b) by 629 days.

This patent is subject to a terminal disclaimer.

(21) Appl. No.: 10/228,680

(22) Filed: Aug. 26, 2002

(65) Prior Publication Data

US 2003/0056112 A1 Mar. 20, 2003

Related U.S. Application Data

(63) Continuation of application No. 09/098,075, filed on Jun. 16, 1998, now Pat. No. 6,453,334.

(60) Provisional application No. 60/049,759, filed on Jun. 16, 1997.

(51) Int. Cl.
*G06F 15/16* (2006.01)

(52) U.S. Cl. ..................... 709/203; 709/226

(58) Field of Classification Search ............... 709/202, 709/203, 217, 226–231; 707/4, 204, 103; 379/265; 705/50; 706/10; 710/100; 719/330; 713/201, 200; 326/39; 715/848, 738
See application file for complete search history.

(56) References Cited

U.S. PATENT DOCUMENTS

| | | | | |
|---|---|---|---|---|
| 5,012,512 A * | 4/1991 | Basso et al. | ............ | 379/218.01 |
| 5,293,556 A * | 3/1994 | Hill et al. | ............ | 702/184 |
| 5,442,791 A * | 8/1995 | Wrabetz et al. | ............ | 719/330 |
| 5,544,321 A * | 8/1996 | Theimer et al. | ............ | 709/226 |
| 5,555,376 A * | 9/1996 | Theimer et al. | ............ | 709/229 |
| 5,611,050 A * | 3/1997 | Theimer et al. | ............ | 709/202 |
| 5,696,965 A * | 12/1997 | Dedrick | ............ | 707/10 |
| 5,761,445 A * | 6/1998 | Nguyen | ............ | 710/100 |
| 5,778,395 A * | 7/1998 | Whiting et al. | ............ | 707/204 |
| 5,812,865 A * | 9/1998 | Theimer et al. | ............ | 709/228 |
| 5,878,425 A * | 3/1999 | Redpath | ............ | 707/102 |
| 5,881,232 A * | 3/1999 | Cheng et al. | ............ | 709/217 |
| 5,918,015 A * | 6/1999 | Suzuki et al. | ............ | 709/219 |
| 5,987,454 A * | 11/1999 | Hobbs | ............ | 707/4 |
| 6,014,686 A * | 1/2000 | Elnozahy et al. | ............ | 709/202 |
| 6,028,925 A * | 2/2000 | Van Berkum et al. | .. | 379/265.01 |
| 6,038,379 A * | 3/2000 | Fletcher et al. | ............ | 709/230 |
| 6,049,792 A * | 4/2000 | Hart et al. | ............ | 706/10 |
| 6,098,072 A * | 8/2000 | Sluiman et al. | ......... | 707/103 R |
| 6,281,898 B1 * | 8/2001 | Nikolovska et al. | ......... | 715/848 |
| 6,301,584 B1 * | 10/2001 | Ranger | ............ | 707/103 R |
| 6,311,221 B1 | 10/2001 | Raz et al. | | |
| 6,374,402 B1 | 4/2002 | Schmeidler et al. | | |

(Continued)

OTHER PUBLICATIONS

Mobile Agent Security and Telescript—Tardo, Valente (1996) ; www.cs.nccu.edu.tw/~jong/reports/ps/Compcon96.ps.gz.*

(Continued)

*Primary Examiner*—Thong Vu
(74) *Attorney, Agent, or Firm*—Perkins Coie LLP

(57) ABSTRACT

A file system driver program executes on a local computer. One or more agent procedures is configured to execute on the local computer to access file resources on behalf of a target process. A security process regulates the access of file resources by the agent procedures. The regulation of the agent procedure by the security procedure is based on a property that is unique to the target process.

46 Claims, 18 Drawing Sheets

U.S. PATENT DOCUMENTS

| | | | |
|---|---|---|---|
| 6,453,334 B1* | 9/2002 | Vinson et al. | ............... 709/203 |
| 6,574,618 B1 | 6/2003 | Eylon et al. | |
| 6,598,125 B1 | 7/2003 | Romm | |
| 6,609,114 B1* | 8/2003 | Gressel et al. | ................. 705/50 |
| 6,622,137 B1 | 9/2003 | Ravid et al. | |
| 6,757,894 B1 | 6/2004 | Eylon et al. | |
| 6,763,370 B1 | 7/2004 | Schmeidler et al. | |
| 6,779,179 B1 | 8/2004 | Romm et al. | |
| 2001/0037399 A1 | 11/2001 | Eylon et al. | |
| 2001/0044850 A1 | 11/2001 | Raz et al. | |
| 2002/0042833 A1 | 4/2002 | Hendier et al. | |
| 2002/0078203 A1 | 6/2002 | Greschler et al. | |
| 2002/0083183 A1 | 6/2002 | Pujare et al. | |
| 2002/0087717 A1 | 7/2002 | Artzi et al. | |
| 2002/0087883 A1 | 7/2002 | Wohlgemuth et al. | |
| 2002/0091763 A1 | 7/2002 | Shah et al. | |
| 2002/0138640 A1 | 9/2002 | Raz et al. | |
| 2002/0156911 A1 | 10/2002 | Croman et al. | |
| 2002/0157089 A1 | 10/2002 | Patel et al. | |
| 2002/0161908 A1 | 10/2002 | Benitez et al. | |
| 2002/0174215 A1 | 11/2002 | Schaefer | |
| 2003/0004882 A1 | 1/2003 | Holler et al. | |
| 2003/0009538 A1 | 1/2003 | Shah et al. | |
| 2003/0056112 A1 | 3/2003 | Vinson et al. | |
| 2003/0140160 A1 | 7/2003 | Raz et al. | |
| 2004/0230971 A1 | 11/2004 | Rachman et al. | |
| 2004/0268361 A1 | 12/2004 | Schaefer | |
| 2005/0010670 A1 | 1/2005 | Greschler et al. | |

OTHER PUBLICATIONS

Secure Transaction Processing in Firm Real-Time Database Systems—Binto George (1997) dsl.serc.iisc.ernet.in/pub/secsigmod97.ps.*

An Architectural Overview of UNIX Network Security www.alw.nih.gov/Security/Docs/network-security.html.*

Design and Performance of an Object-Oriented Framework..—Pyarali, Harrison.. (1996) www.cs.wustl.edu/~schmidt/COOTS-96.ps.gz.*

REFEREE: Trust Management for Web Applications—Chu, Feigenbaum, LaMacchia.. www.research.att.com/~trmaster/./TRs/97/97.2/97.2.1body.ps.*

Status of Industry Work on Signed Mobile Code—Matthew Faupel www.terena.nl/conf/jenc8/papers/313.ps.*

U.S. Appl. No. 10/023,915, filed Dec. 14, 2001, De Vries et al.
U.S. Appl. No. 10/926,635, filed Aug. 25, 2004, Jeffrey De Vries.
U.S. Appl. No. 10/988,014, filed Nov. 11, 2004, Jeffrey De Vries.

* cited by examiner

METHOD AND APPARATUS FOR STREAMING SOFTWARE

CROSS-REFERENCE TO RELATED APPLICATIONS

This application is a continuation of U.S. patent application Ser. No. 09/098,075, filed on Jun. 16, 1998 now U.S. Pat. No. 6,453,334, which claims the benefit of U.S. Provisional Patent Application No. 60/049,759, filed Jun. 16, 1997.

TECHNICAL FIELD

The present invention relates to network file systems, and in particular, methods of allowing remotely located programs and/or data to be accessed on a local computer without exposing the remote program and/or data (henceforth collectively referred to as the target program) to indiscriminant copying. In addition, methods of limiting the length of time that the target program can be executed or accessed on the local computer are applicable. A persistent caching scheme is also described which allows subsequent accesses to the program or data to proceed with reduced download requirements even across different connection sessions.

BACKGROUND

There are many instances in which it would be desirable to allow a remotely located target program to be executed on a local computer without exposing the target program in question to the threat of indiscriminate copying and propagation. Additionally, time-limiting the execution of the remotely located target program would add additional benefits and control. Some of the areas that could benefit from such a capability are the rental of computer programs over the Internet, try-before-you-buy evaluation of computer programs, and pay-per view of internet-based information sources, among others.

Traditional network file system drivers allow local computer to access remotely-located programs and/or data as if they were local, but also allowed those programs and data to be copied to the local computer, and then be propagated indiscriminately.

SUMMARY

Figure 1A:
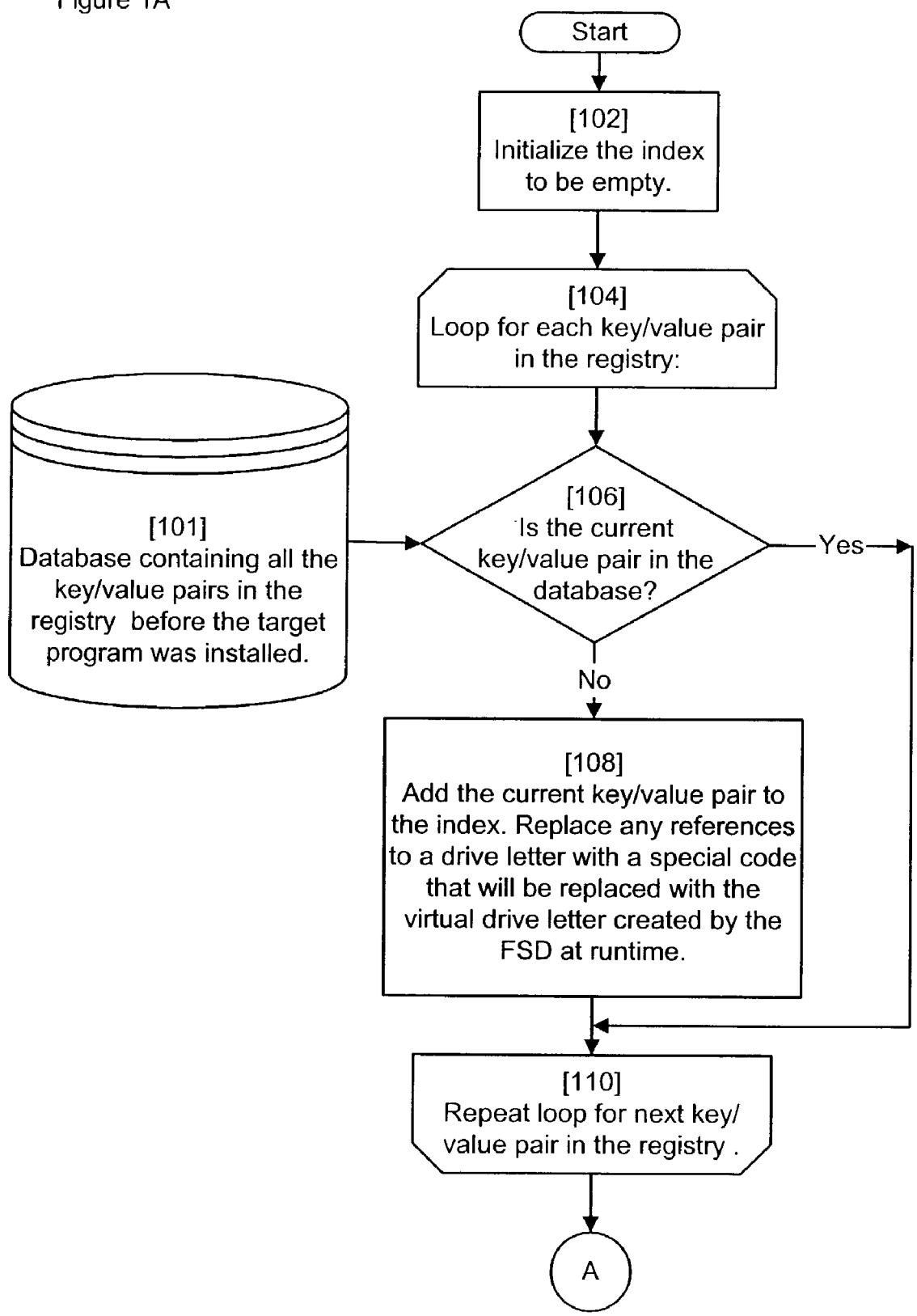
FIGS. 1A to 1C—Flowchart of Decimation Procedure, showing how the target program on the install system is transformed into an index file and a set of chunk files on the runtime server.

This invention extends a traditional network file system driver with fine-grain, process-specific access control, time-limited access, and a persistent caching scheme. Only those portions of the program or data actually used are downloaded, and the parts that are downloaded are compressed for improved network performance and encrypted for security. A persistent caching scheme that allows the working-set of the target program to reside on the client machine (limited, by the user-configurable size of the local cache) in a secure manner allows subsequent executions of the target program to load and execute with reduced requirements for downloading from the remote computer.

The present invention provides a method and apparatus for allowing a remotely-located computer program or data to be accessed on a local computer in such a way as to severely limit the possibility of said program or data being indiscriminately copied and propagated, plus providing time limits on the access to said program or data. A persistent caching scheme improves performance of subsequent accesses.

A core component of the present invention is a network file system driver that simulates a local drive, but only allows access to that drive to designated computer processes. Process ID's are used to limit access to the program and/or data. A client program referred to as the client-agent accomplishes control of the network file system driver.

The persistent cache retains sufficient information about the blocks contained within to allow subsequent accesses, even when separated by disjoint sessions, to continue to be referenceable. All data in the cache is maintained in an encrypted state; at no time does the decrypted version of the program and/or data reside on the local disk.

DETAILED DESCRIPTION OF INVENTION

The method whereby a remotely located program and/or data can be accessed securely in a time-constrained manner includes several interrelated pieces and/or phases. Some of these are as follows:

1. Installation of the target program on a clean install system.
2. Preprocessing of the target program after it has been installed.
3. Installation of the software components that implement this invention onto the client machine.
4. The selection and activation of a particular target program.

5. Launch, initialization, and execution of the client-agent software component.

6. Execution of the network file system driver.

Each of these steps or phases is now described in more detail, below.

Installation of Target Program

The program to be remotely executed (hereafter referred to as the target program) is first installed on a clean system on which the contents of the registry is known, and all files prior to the installation of the target program are known. (The description is in the context of a Windows 95-type system.) By knowing the state of the machine before the installation of the target program, changes made to the install machine caused by the installation of the target program can be determined. It is sometimes required to run the target program on the install system so that any final installation steps needed by the target program can be determined. This need is determined manually on a case-by-case basis.

Preprocessing of Target Program

Figure 1B:
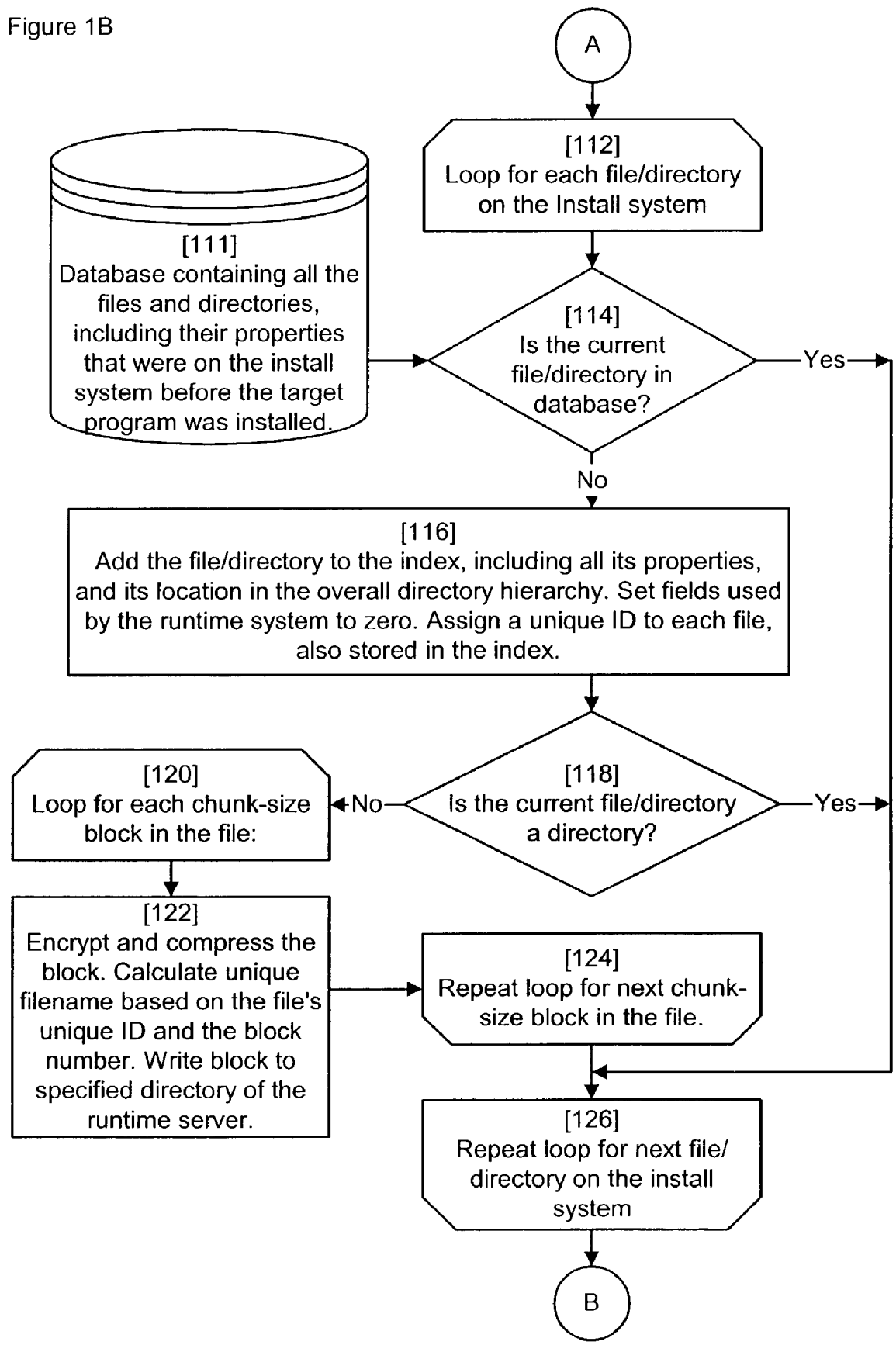
Figure 1C:
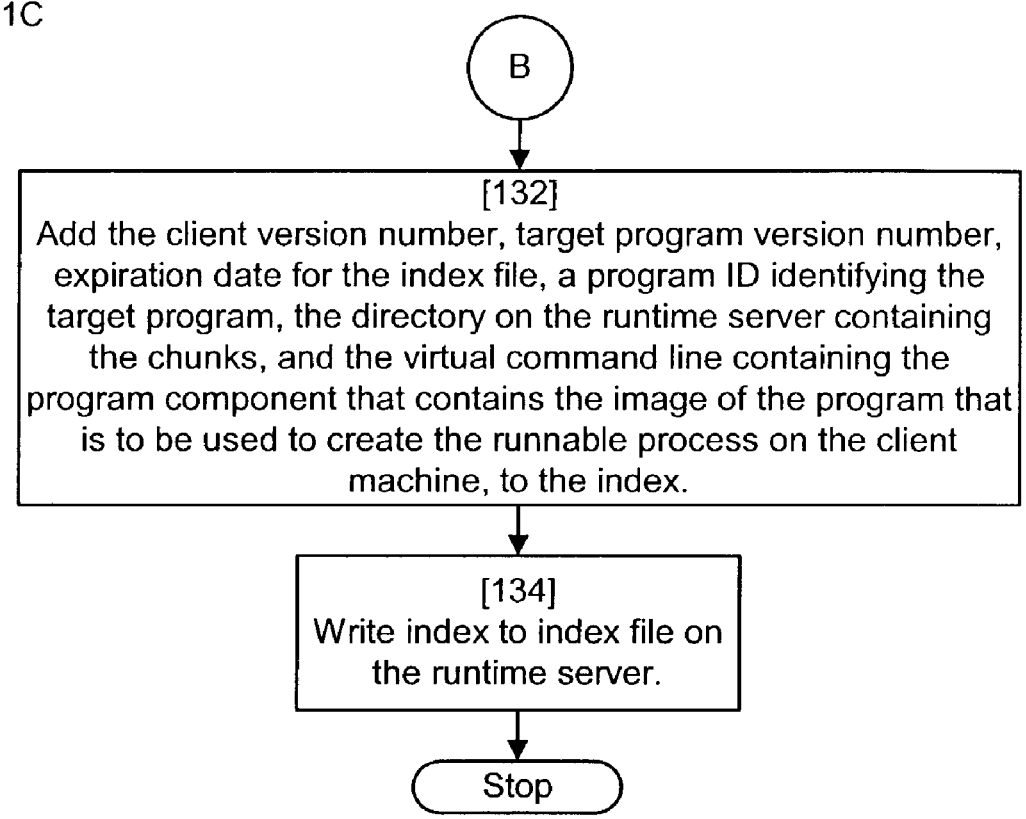
Figure 2A:
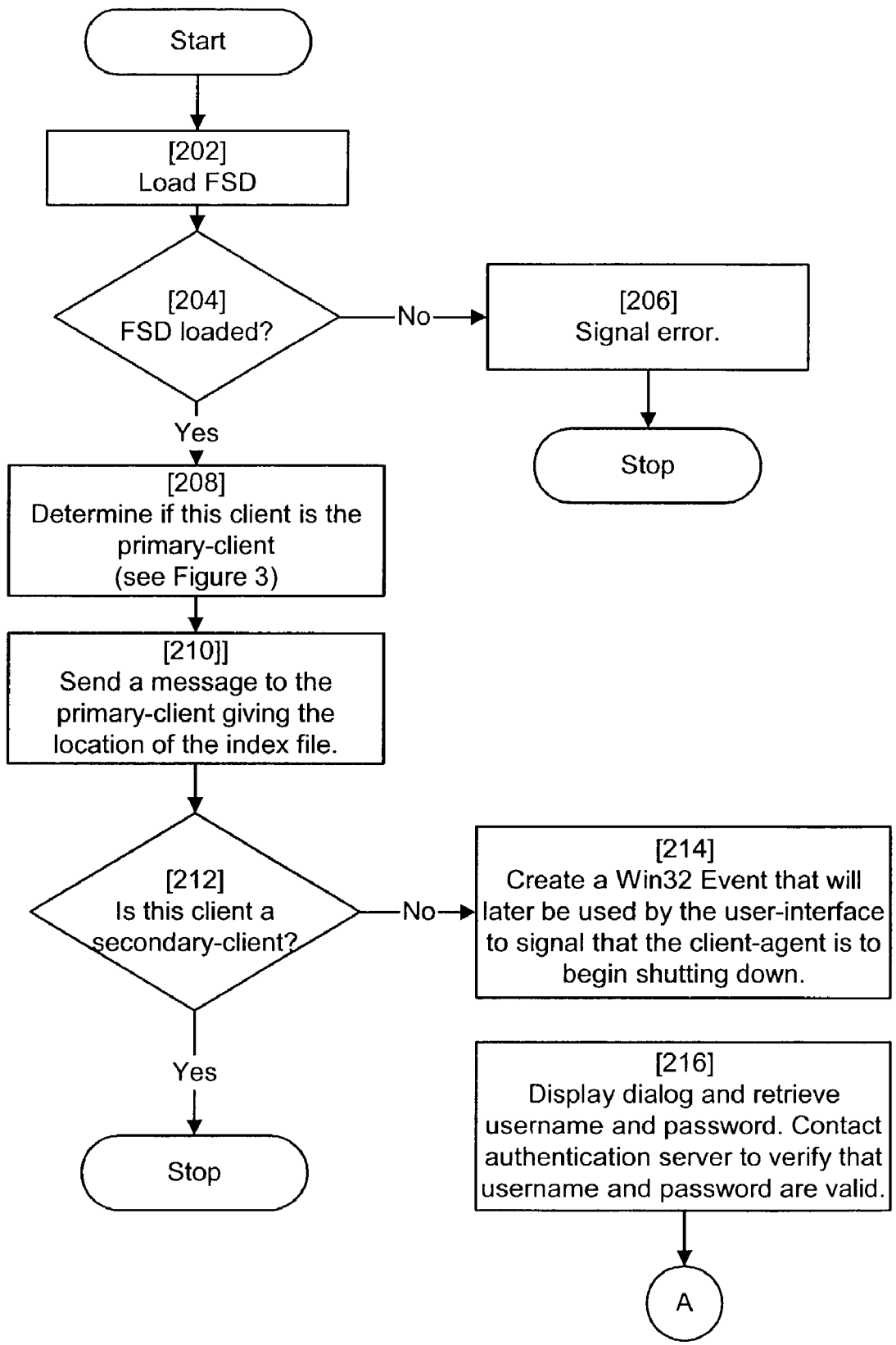
FIGS. 2A to 2D—Flowchart of Client-Agent Procedure, showing how the client-agent is initialized, and the steps taken to initiate access to the target program.
Figure 2B:
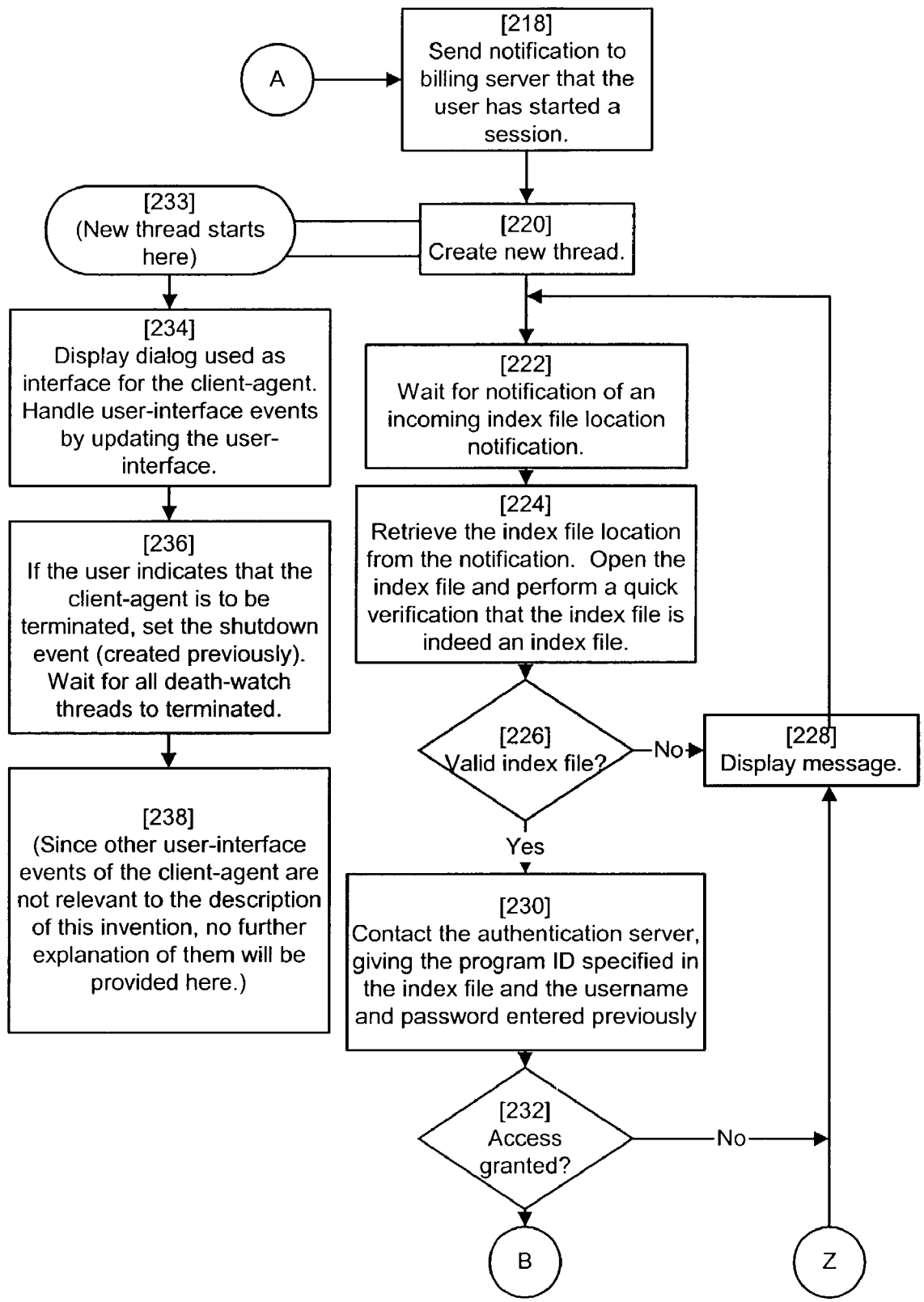
Figure 2C:
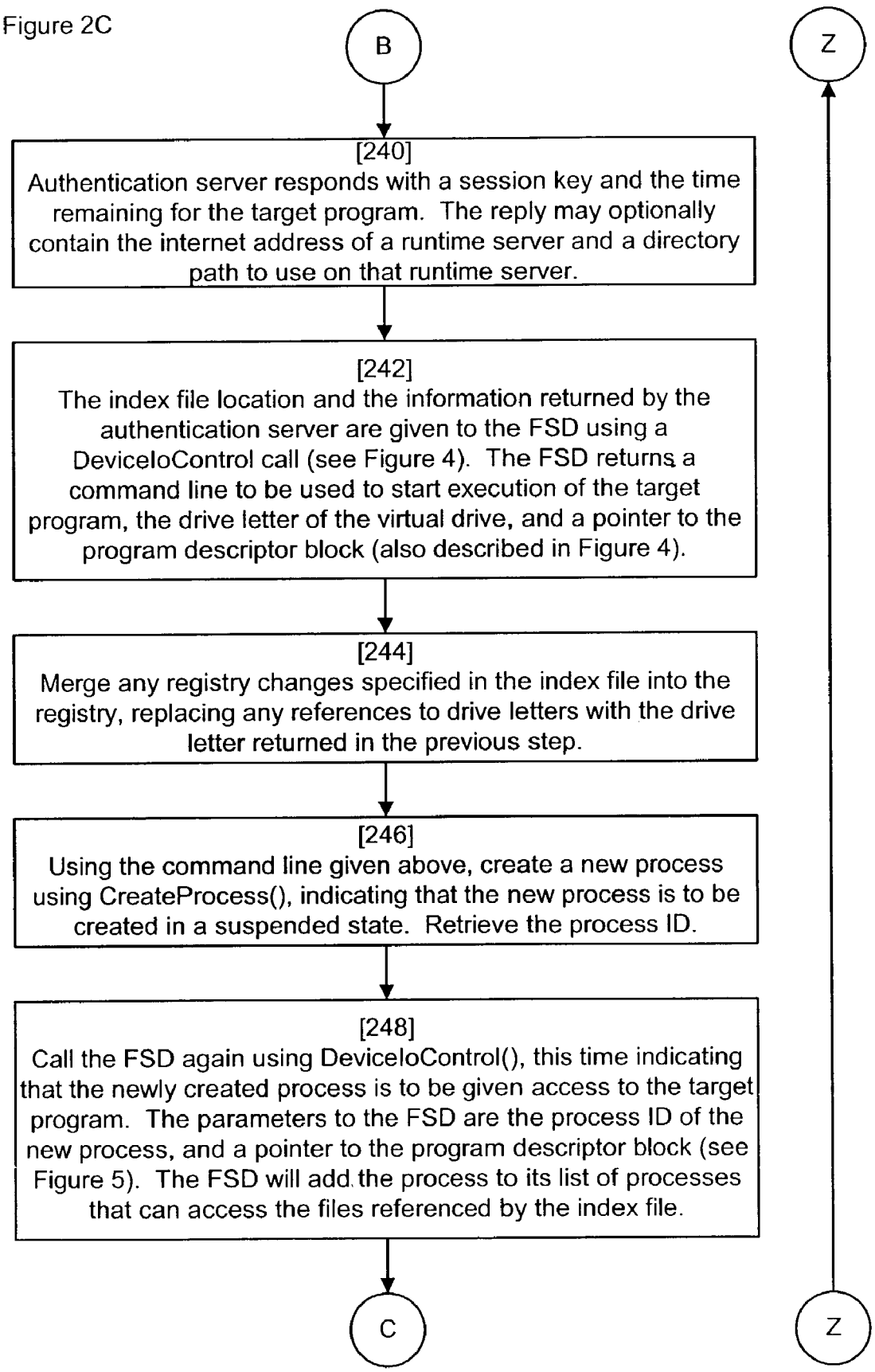
Figure 2D:
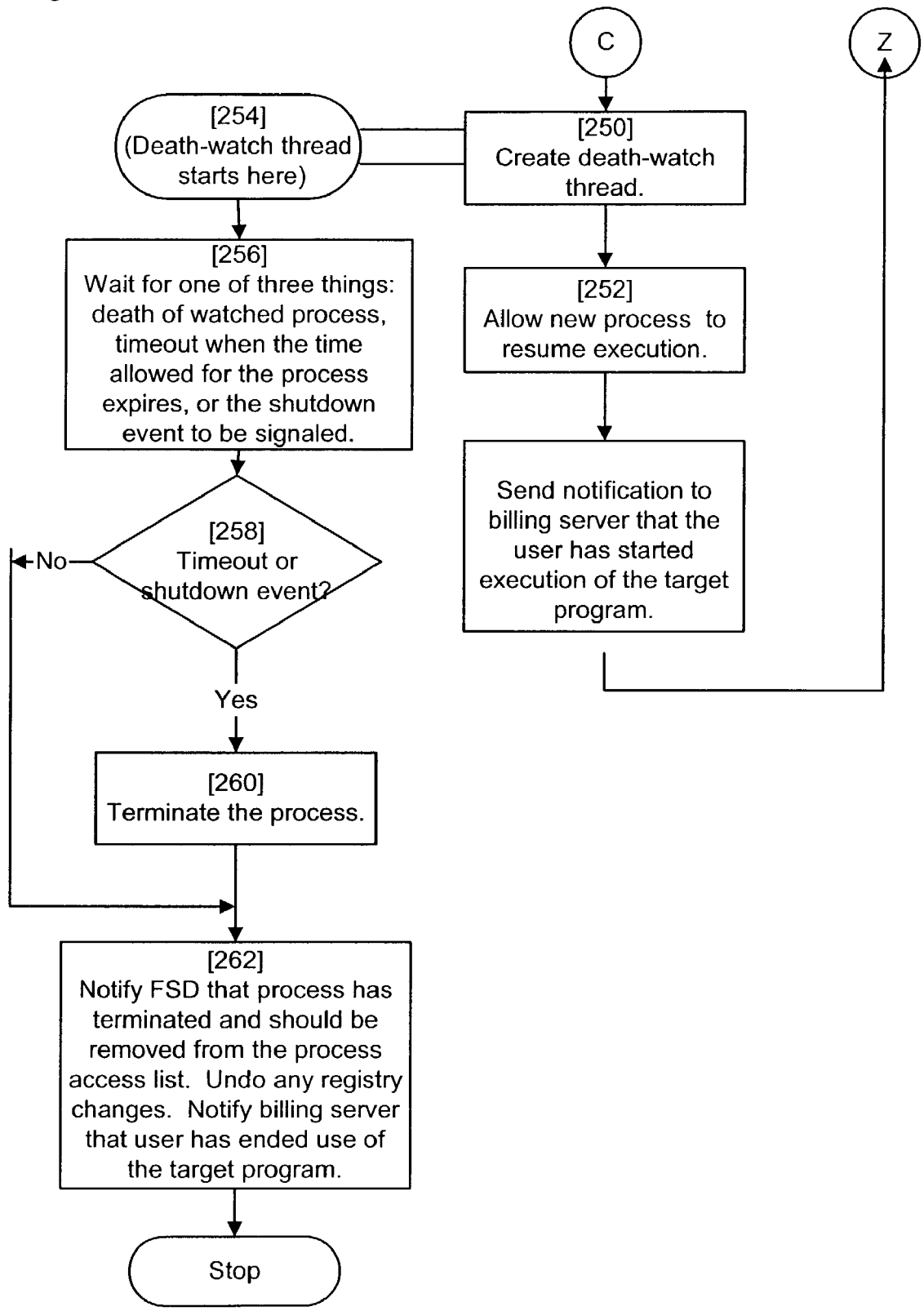

The purpose of the preprocessing phase is twofold: To create an index containing information about all the registry changes, files, and directories created by the installation of the target program, and to break-up the program and all its data into "chunks" which are then encrypted, compressed, and placed on the runtime server. The index is used by the client-side file system driver (hereafter the FSD) to present a virtual directory structure to the client machine, including all file properties (file size, last modification time, etc.) and the overall directory structure. The chunks are downloaded by the FSD and cached, decompressed, and decrypted as needed during the execution of the target program on. the client machine. The files are preferably broken into compressed, encrypted chunks in a preprocessing phase, rather than during runtime, to improve runtime performance. The index also contains the information used by the FSD to compute which chunk to download at runtime as it is needed. As illustrated in FIG. 1, one possible procedure that could be used to create the index and produce the chunks is as follows:

Decimation Procedure—Creates the Index and Produces the Downloadable Chunks.

Phase 1—Installation

1. Initialize the index to be empty (step 102)

Phase 2—Record Registry Changes (steps 104, 106, 108 and 110)

1. Assume that a database 101 has been previously created containing all the key/value pairs in the registry before the target program was installed. Note that performing steps 2 and 3 (suitably modified) with an initially empty database can create this database.

2. (step 106) Enumerate all the key/value pairs in the registry. For each key/value pair that is not in the database of known key/value pairs, perform step 3. If there are no more key/value pairs, go to the next phase, Phase 3.

3. (step 108) Add the key and value to the index. Replace any references to a drive letter with a special code that will replaced with the virtual drive letter created by the FSD at runtime.

Phase 3—Record File/Directory Changes

1. Assume that a database 111 has been previously created containing all the files and directories, including their properties, that were on the install system before the target program was installed. Note that performing steps 2 and 3 (suitably modified) with an initially empty database can create this database.

2. Traverse the directory structure of the drive on the install system (step 112). For each directory/file that is not in the database of known directories/files (step 114), perform step 3. If there are no more directories/files, go to the next phase, Phase 4.

3. (step 116) Add the directory/file to the index. Include all the properties of the file/directory, including but not limited to: file creation time, last modification lime, last access time, file size, short form of the name, and long form of the name. The location of the file/directory in the overall directory hierarchy is also recorded, using an appropriate tree data structure. Some additional fields which are later filled-in by the runtime system (described in that section) are zeroed out during preprocessing. A unique ID is also assigned to each file, and stored in the index, which will later be used by the FSD to calculate which chunk to download when the contents of that region of the file are needed by the runtime. If the file is not a directory, also perform step 4 below.

4. For each program and data file that is not a directory (steps 118, 120, 124 and 126), break the file up into chunks and write the chunks to individual files on the runtime server. The initial size of each chunk (hereafter chunk-size) is a parameter to the Decimation Procedure, and can be tuned to increase performance; a typical value might be 32768 (i.e. 2**15). The actual decimation into chunks is accomplished (step 122) by opening the file, reading a block of chunk-size bytes, encrypting the block, compressing the block, calculating a unique file name for the block from the unique ID of the file and the block number, writing the just processed block to a new file in the specified directory of the runtime server (the destination directory on the runtime server is another parameter to the Decimation Procedure) using the file name previously generated, and then repeating for the next block in the input file until the end of file is reached.

Phase 4—Record Additional Index Information (step 132)

1. In addition to the registry and file/directory changes recorded in the index by the previous phases, the index also contains the client version number, the target program version number, an expiration date for the index file, a program ID identifying the target program that is used when contacting the authentication server, the directory on the runtime server containing the chunks, and the virtual command line containing the program component that contains the image of the program that is to be used to create the runnable process on the client machine as well as any command line arguments to that program. This data is obtained as parameters to the Decimation Procedure, and are provided manually by the operator running the Decimation Procedure.

2. Write the index data to an index file on the runtime server. (step 134)

After the completion of the Decimation Procedure, the runtime server contains an index file, and a set of preprocessed chunks.

Installation of Client-Side Components

Before a program can be executed on a client machine using the present invention, a set of software components must be installed on the client machine. The three major components are a file system driver (FSD), a network provider system library, and a client-side agent program (hereafter client-agent). These components are usually downloaded from a web site. Depending on the intended use of this invention, billing information may also be gathered from the user prior to the download of the client-side components. This billing information would be used if the present invention was to be used for, say, software rental.

The components are usually supplied with an installation program. The installation program copies the FSD and network provider library to the usual places for network file system drivers, and places the client-agent in a user-specified directory. The registry is updated to reflect the addition of a new network file system driver, providing the customary information usually given for network file system drivers.

An additional part of the installation involves registering a new file type with the Windows Explorer, also referred to as the Shell. The index file (described above) is given a unique file extension used exclusively by the client-agent. The Windows Explorer registry settings are updated to associate this unique file extension with the client-agent. Thus, whenever an index file with the given extension is opened, the client-agent is started and the index file supplied as a command line argument to the client-agent.

A final installation step is to associate a new MIME type, application/x-gamewave, with the index file and update the settings for the web browser so that when a web page contains a link to an index file, and that link is clicked by the user, the web browser downloads the index file to the client machine, starts the client-agent, and passes the index file location to the client-agent. The details of the changes required are different for different web browsers, but can be obtained from the respective browser publishers.

The client machine is typically rebooted after the installation of the client-side components.

User Selection and Initiation of Target Program

After the preceding steps, the user may then use their web browser to navigate to a web site, and click on a link indicating a target program listed on a web page. The link points to the index file for that target program. The web browser initiates retrieval of the index file, and based on the MIME type for the index file, which was setup during installation, knows that the index file should be downloaded to the client machine and the client-agent started with the location of the index file given as an argument to the client-agent. The web browser downloads the index file; the web browser starts the client-agent, and the location of the index file that was downloaded is given to the client-agent.

Optionally, once an index file has been downloaded to the client machine, the user can bypass navigating to the web site and selecting the link for the target program, and can instead just directly open the index file already present on the client machine. Since the index file's file extension was registered with the Windows Explorer, opening the index file will cause the client-agent to be started with the location of the index file given as an argument to the client-agent.

Launch, Initialization, and Execution of Client-Agent

When the client-agent is launched, as described in the previous section, it performs steps similar to the ones described here as illustrated in FIGS. 2A, 2B, 2C and 2D.

Client-Agent Procedure—Describes Actions Taken by Client-agent

Phase 1—FSD Loading and Primary Client-Agent Checks

1. Attempt to load the FSD (step 202). If it isn't already loaded and can't be loaded, signal an error condition (step 204 and 206) and stop further execution of the client-agent.

2. (step 208) Contact the FSD, via a DeviceloControl( ) call, and determine the primary client-agent, as described below in the Client-Agent Registration Procedure. The primary client-agent is the first client-agent that begins execution and contacts the FSD. All subsequent client-agents are referred to as secondary client-agents. Because of how the client-agent is activated, it is possible for more than one client-agent to start execution. The primary client-agent is responsible for performing all client-agent functions, white the secondary client-agents will merely pass on requests to the primary client-agent and eventually exit.

3. (step 210) Regardless of whether this is a primary or secondary client-agent, send a message to the primary client-agent giving the location of the index file. One possible way to do this would be to have the FSD return the window handle for the primary client-agent, and then use SendMessage( ) to send an appropriate WM_USER-derived message with a parameter containing a string describing the index file location.

4. If this is a secondary client-agent (step 212), exit at this point. Otherwise, continue to the next step, step 5.

5. (step 214) Create a Win32 event that will later be used by the user-interface to signal that the client-agent is to begin shutting down. The event is a manual reset event, and is initially in the non-signaled state. This event variable will hereafter be referred as the e_ShutdownClientAgent event.

6. (step 216) Display a dialog, and retrieve the username and password from the user. The authentication server is contacted, and an initial verification is made that the username and password are valid.

7. If a billing server is part of the intended use of the present invention, a notification is sent to the billing server at this point indicating that the specified user has started a session. (step 218)

Phase 2—Processing of Incoming Index File Location Notifications

1. A new thread is created (step 220) and begins execution with the steps outlined in the next phase, Phase 3. The main thread continues to execute the following steps, remaining in Phase 2.

2. (step 222) Wait for notification of an incoming index file location notification. When a new notification arrives, proceed with step 3, below.

3. (step 224) Retrieve the index file location from the notification. Open the index file and perform a quick verification that the index file is indeed an index file. If the index file is invalid (step 226), display a message (step 228) and go back to step 2, above.

4. Contact the authentication server, (step 230) giving the program ID specified in the index file and the username and password entered in step 6 of Phase 1. If access is denied (step 232), display a message (step 228) and go back to step 2, above.

5. If access is granted (step 232), the authentication server will respond with a session key for this execution of the target program, and the remaining time left in which to allow execution of the target program. The reply may also optionally contain an Internet address of a machine to use as the runtime server and the directory path to use on that runtime server. (step 240)

6. The index file location and the information returned by the authentication server are then given to the FSD using a DeviceloControl (call. The FSD adds the index file information and the information returned by the authentication server to its internal tables (which is described in greater detail below in the Index File Insertion Procedure). The FSD will return a string containing a command line to be executed by a call to CreateProcess ( ) that will actually start the execution of the target program. The drive letter to use to reference the virtual drive, as well as a pointer to the program descriptor block (also described in the Index File Insertion Procedure) is also returned. (step 242)

7. Merge any registry changes specified in the index file into the registry, replacing any references to drive letters with the drive letter returned in step 6, above. (step 244)

8. Using the command One returned in step 6, create a new process using the CreateProcess ( ) system call. In the call to CreateProcess ( ), indicate that the process is to initially be created in a suspended state. Retrieve the process ID for the newly created process. (step 246)

9. Call the FSD via DeviceIoControl ( ) again, this time indicating that the newly created process is to be given access to the target program specified by the index file used in step 6 above. The parameters to the FSD are the process ID of the new process, and the pointer to the program descriptor block returned in step 6 above. This is covered in more detail in the Add Process Access Procedure below. The FSD will add the process to its list of processes that can access the files referenced by the index file inserted in step 6. (step 248)

10. Create a deathwatch thread that will notify the client-agent when the newly created process exits. (step 250) The newly created thread starts executing the instructions described in phase 4 below. (step 252) The current thread continues execution with the following step, step 10.

11. Allow the newly created process to resume execution using the ResumeThread ( ) system call. (step 254) At this point the operating system begins to execute the newly created process. All file operations are handled by the FSD, which downloads, caches, decompresses, and decrypts the pieces of the program as needed. (This is described in more detail in the FSD section). The FSD will only allow the newly created process to "see" the files referenced by the index file; all other processes will see either nothing or will receive access violation errors, depending on the type of access attempted.

12. If a billing server is part of the intended use of the present invention, a notification message is sent at this point to the billing server indicating that the user has started execution of the designated target program, as specified in the index file. (step 254)

13. Go back to step 2 and wait for another index file location notification.

Phase 3—Handle Display Updates for Client-Agent.

1. While the main thread waits for index file location notification messages (as described in the previous phase), the new thread created to handle phase 3 processing is responsible for performing display updates and user-interface functionality of the client-agent. (step 233)

2. Display the dialog used as the user-interface for the client-agent. Handle user-interface events by updating the user-interface. (step 234)

3. If the user indicates that the client-agent is to be terminated, set the e_ShutdownClientAgent event, and wait for all deathwatch threads (described above and in phase 4 below) to terminate. (step 236)

4. Since other user-interface events of the client-agent are not relevant to the description of this invention, no further explanation of them will be provided here. (step 238)

Phase 4—Process Deathwatch Threads

1. A deathwatch thread is started for each new process created. The function of the deathwatch thread is to detect when the newly created process exits, so that the primary client-agent can perform any clean up associated with the process exiting. (step 254)

2. The death-watch thread waits for one of three things: the demise of the watched process, a timeout when the time allowed for the process to access the program expires (this time value was retrieved in phase 2, step 5, above, from the authentication server), or the e_ShutdownClientAgent event becomes signaled. Based on the reason why the death-watch thread was awakened, perform the appropriate step below (step 256)

3. If the thread was awakened by the demise of the watched process, notify the FSD that the process is terminating and should be removed from the program descriptor block's process access list (described in the FSD section below). Undo any registry changes specified in the index file. If a billing server is part of the intended use of the present invention, send a notification message to the billing server indicating that the user has ended use of the designated target program, as specified in the index file. Perform any additional clean up and modifications required by the user-interface, then let the deathwatch thread terminate. (step 262)

4. If the thread was awakened by the timeout of the time allowed for the process to access the target program, terminate the process (step 260) and then perform the processing described in step 3, above. (step 262) As an option, the client-agent agent could prompt the user if additional time is desired, and then takes steps to reset the timer. If the authentication server granted additional time, go back to step 2.

5. If the signaling of the e_ShutdownClientAgent event awakened the thread, terminate the process (step 260) and then perform the additional actions specified in step 3, above. (step 262)

File System Driver (FSD) Description

Since the file system driver (FSD) described by this invention is in essence an enhanced network file system driver, it will be assumed that the reader is familiar with the implementation of network file system drivers, and only the differences and enhancements to a baseline network file system driver will be described. For more information on implementing network file system drivers, see the Microsoft DDK documentation, Walter Oney's book, "Systems Programming for Windows 95", Microsoft Press, 1996, or Stan Mitchell's book, "Inside the Windows 95 File System", O'Reilly & Associates, Inc., 1997.

The primary difference between a baseline network file system driver and the present invention is in controlling access to the remote components, and in maintaining a persistent but secure cache. The FSD creates a virtual drive, complete with drive letter, and places each target program that is to be accessed under a top-level directory on that virtual drive.

Descriptions of each of these major FSD functionality groups follow.

FSD—Registration of Client-Agents, and Determination of Primary Client-Agent

Figure 3:
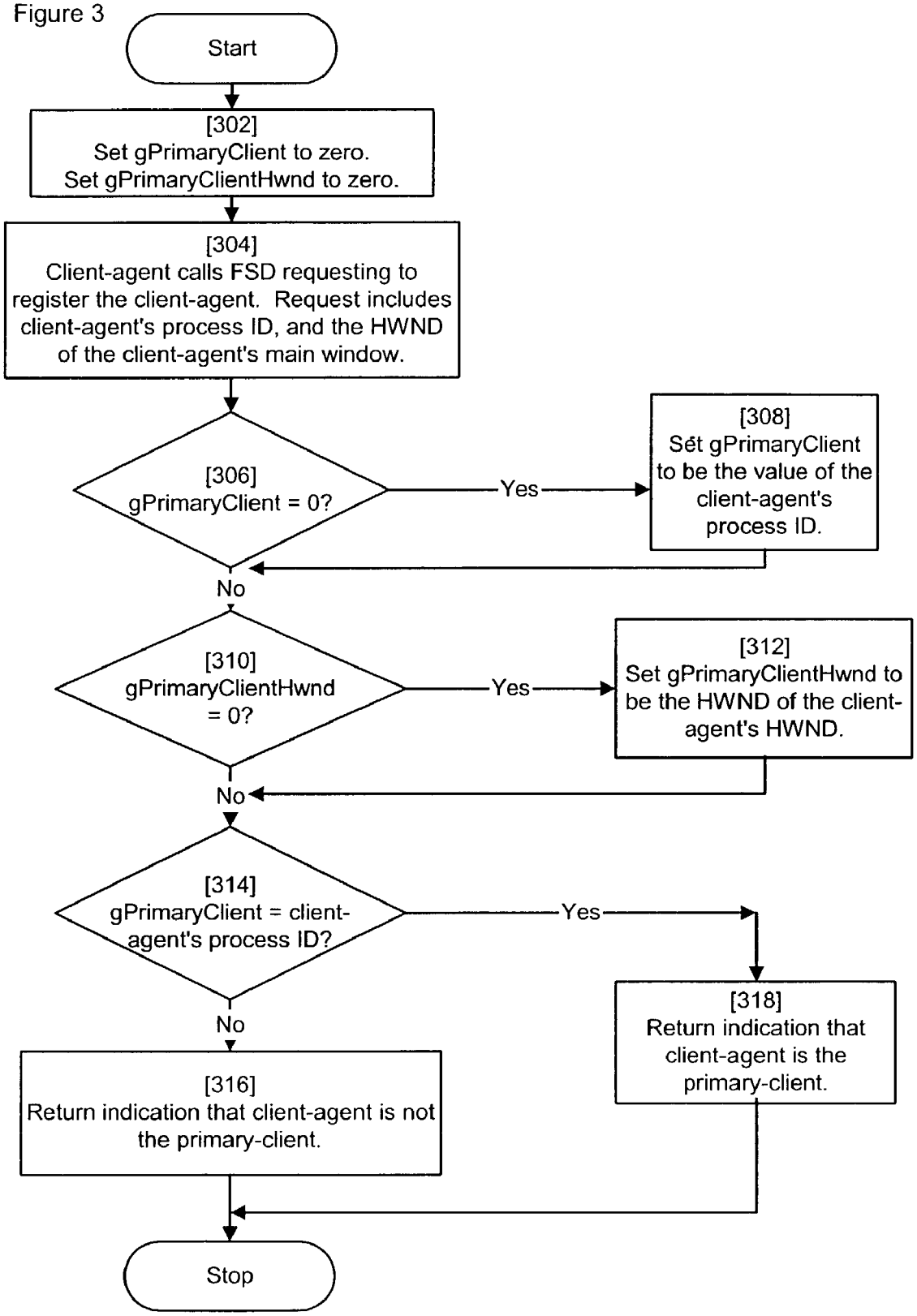
FIG. 3—Flowchart of Client-Agent Registration Procedure, showing how the client-agent determines whether it is the primary client-agent or a secondary client-agent.

As was described in a previous section on the launch, initialization, and execution of the client-agent, the client-agent attempts to register with the FSD and to determine if it is the primary client-agent. One possible procedure on how this could be done is given here and illustrated in FIG. 3.

Client-Agent Registration with FSD Procedure—Registers Client-Agent with FSD.

1. Assume that the FSD maintains a global variable, hereafter referred to as g_PrimaryClientID, that initially is zero. (step 302) After the primary client-agent has been successfully registered, this variable will hold the process ID of the primary client-agent. Also assume that another global variable, g_PrimaryClientHwnd, is also initially zero. After the primary client-agent has registered, this variable will hold the HWND of the primary client-agent main window. The use of the HWND is described in the procedure for launching, initializing, and executing the client-agent.

2. (step 304) After the client-agent has started execution and opened the FSD, it uses DeviceloControl ( ) to call the FSD, passing in a code indicating this is a request to register the client-agent, the client-agent's process ID, and the HWND of the client-agent's main window.

3. If g_PrimaryClientID is zero, (step 306) set it to be the value of the process ID passed in by the calling client-agent. (step 308) If g_PrimaryClientHwnd is zero (step 310), set it to be the value of the HWND passed in by the calling client-agent. (step 312)

4. If the value of g_PrimaryClientID is the same as the value of the process ID passed in by the calling client-agent (step 314), return a result code indicating that the calling client-agent is the primary client-agent. (step 316) Otherwise, return a result code indicating that the calling client-agent is a secondary client-agent, and also return the value of g PrimaryClientHwnd as the HWND of the primary client-agent. (step 318)

FSD—Index File Insertion

As was described in the section on the launch, initialization, and execution of the client-agent, whenever a new index file location notification is received by the client-agent, it attempts to insert the specified index file into the FSD so that the target program specified by the index file may be accessed. The FSD maintains a list of all the index files thus inserted. The elements of this list are called program descriptor blocks, and contain the following fields: forward and backward links to the other program descriptor blocks in the list, a pointer to the file and directory information tree containing all the data read from the index file, the top level directory name this program descriptor block will correspond to on the virtual drive created by the FSD, and a map of valid process ID's that have access to files in this program descriptor block.

Figure 4:
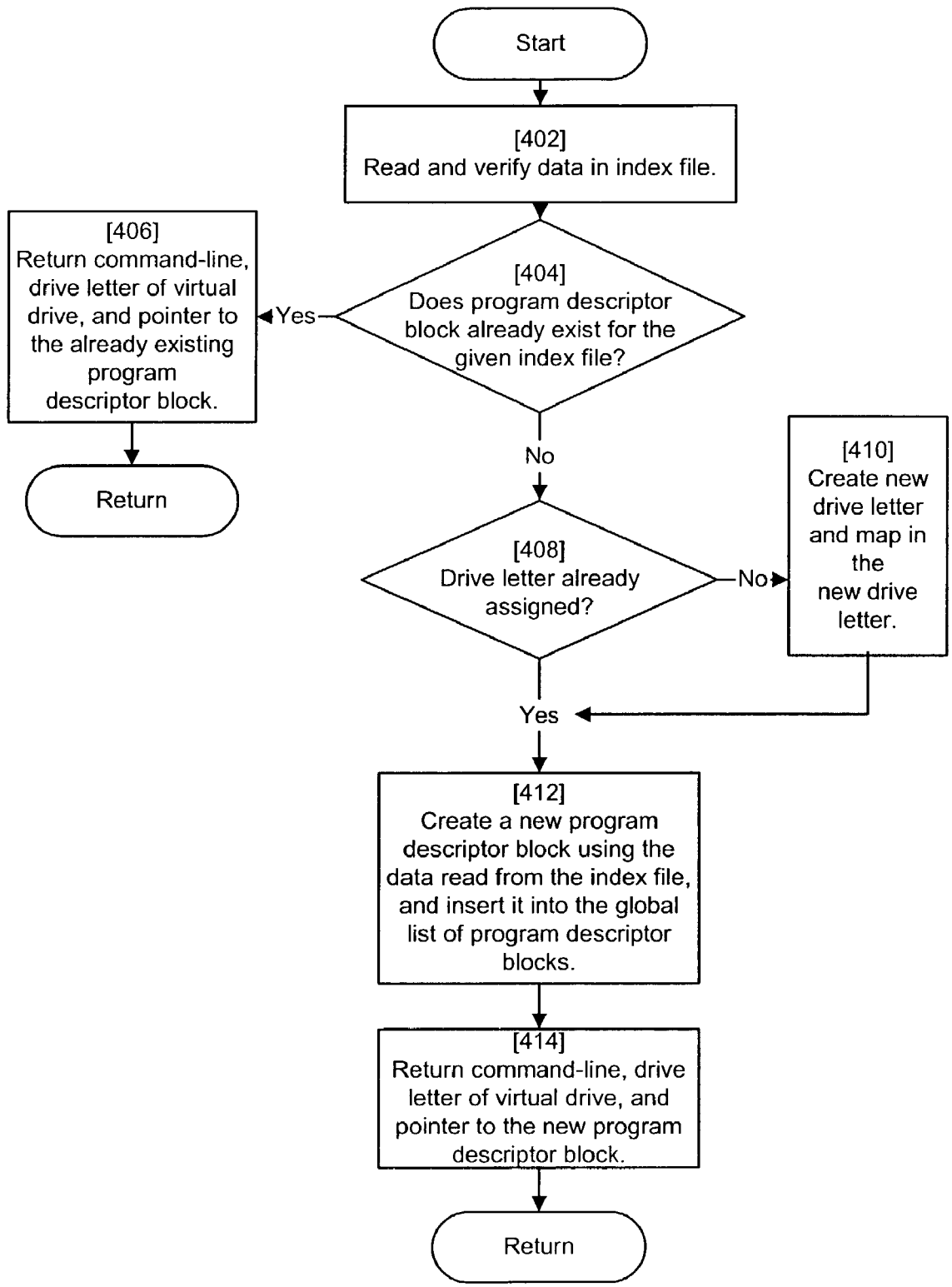
FIG. 4—Flowchart of Index File Insertion Procedure, showing how an index file is inserted into the FSD, thereby creating a virtual directory structure.

A procedure for inserting the index file information into the FSD could be described as follows and as illustrated in FIG. 4:

Index File insertion Procedure—Adds the Data Contained in an Index File to the FSD.

1. Read and verify the data in the index file to be inserted. (step 402)

2. If a program descriptor block already exists for the given index file (step 404), return the command line (as specified in the index file), the drive letter of the virtual drive, and a pointer to the already existing program descriptor block (step 406).

3. If a drive letter for the virtual drive has not already been created (step 409), create one now, and map in the new drive letter. (step 410)

4. (step 412) Create a new program descriptor block using the data read from the index file, and insert it into the global list of program descriptor blocks. The map of valid process ID's for this program descriptor block contains only the process ID of the primary client-agent at this point. No other process can see the files or directories hiding beneath this program descriptor block. Adding a new program descriptor block causes a new top-level directory to appear on the virtual drive. Underneath this top-level directory is a virtual directory structure containing all the files and directories that were decimated in the pre-processing phase. The data in the index file is used to produce the virtual directory structure.

5. Return the command line, virtual drive letter, and pointer to the program descriptor block. (step 414)

FSD—Add Process Access

Figure 5:
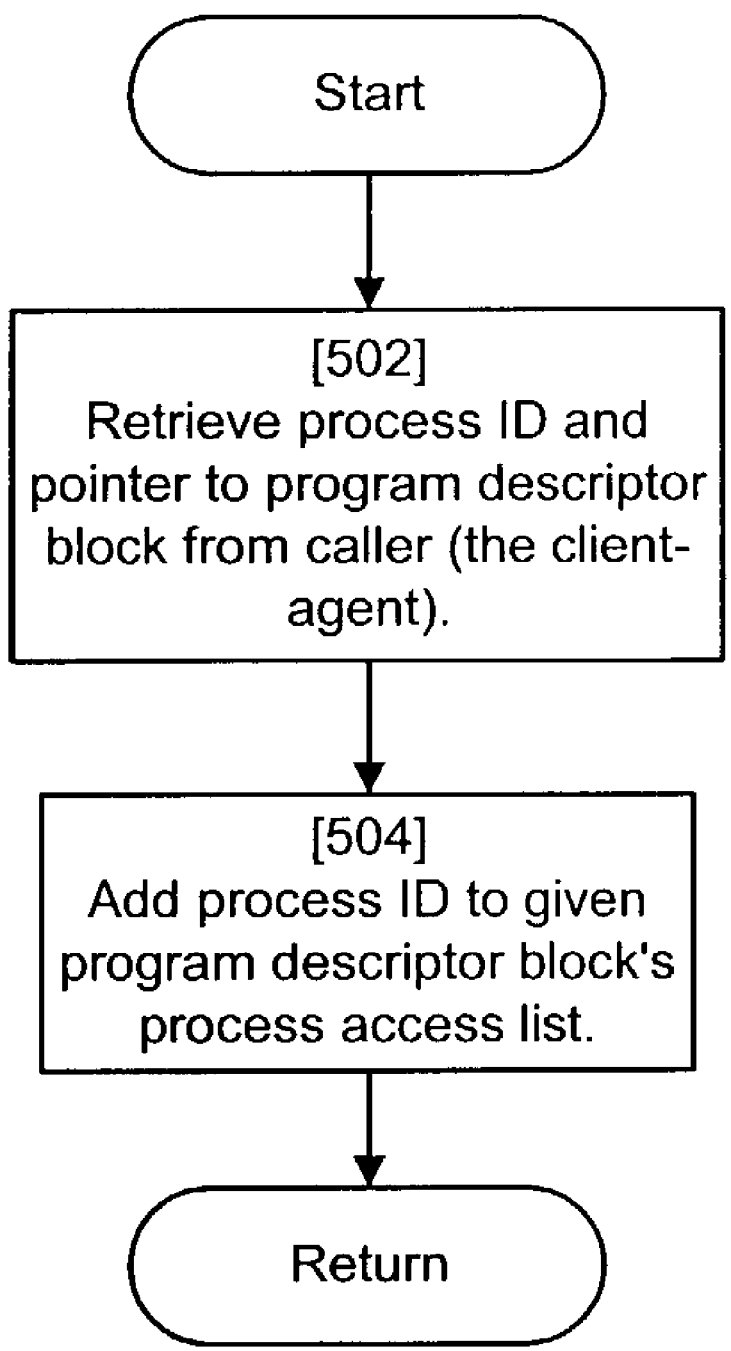
FIG. 5—Flowchart of Add Process Access Procedure, showing how a process is added to the process access list, thereby granting access to the process to use the virtual directory structure.
Figure 6:
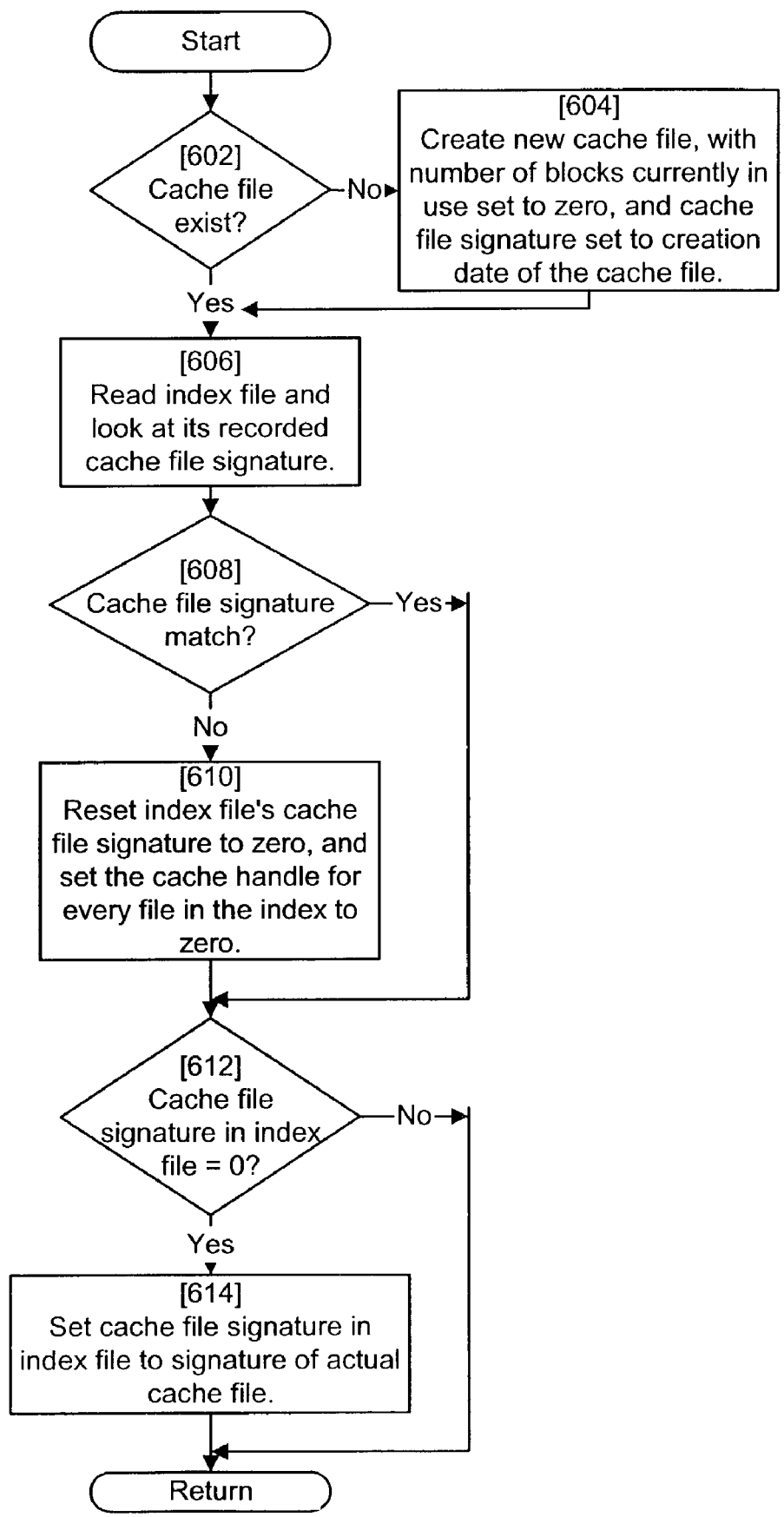
FIG. 6—Flowchart of Index File to Cache File Binding Procedure, showing how a downloaded index file is synchronized with the cache file.

Access to the virtual directory structure underneath a top-level directory on the virtual drive is granted based on process ID's. In order for a process to be created that can access the files in the virtual directory, the process ID for that process must be added to the process access list of the program descriptor block controlling access to the virtual directory structure. Adding a process to a program descriptor block's process access list could be performed with a procedure similar to this and as illustrated in FIG. 5:

Add Process Access Procedure—Grants Access to the Given Process to the Target Program.

1. As was described in the section above on launching, initializing, and executing the client-agent, this procedure is called with a process ID of a suspended process, and a pointer to a program descriptor block returned from the Index File Insertion Procedure, above. (step 502)

2. Add the process ID to the given program descriptor block's process access list. The specified process can now see the virtual directory structure beneath the top-level directory corresponding to the given program descriptor block on the virtual drive. (step 504)

FSD—Persistent Cache Architecture

The FSD maintains a two level cache. The first level is an in-memory cache consisting of blocks each containing 4K of data, and is implemented using the VCACHE block cache module provided by the operating system. The second level is an on-disk cache implemented as described here.

All the data for the on-disk cache is maintained in a single file, the maximum size of which can be adjusted by the user using the user-interface of the client-agent. The on-disk cache file contains the following items: a cache file version number, a unique cache file signature (derived from the creation time of the cache file), a counter specifying the next cache block handle (described later) to allocate, the current number of on-disk cache blocks in use, the maximum number of on-disk cache blocks to allow, an array (with enough entries to hold the maximum number of allowable on-disk cache blocks) of block descriptors (described later) in LRU order, followed by the actual cache blocks themselves. The size of each cache block is fixed, and is larger enough to contain an encrypted version of a file chunk as produced by the Decimation Procedure, described earlier. A block descriptor consists of a cache block handle, a block number, and the actual size of the data within the indicated block. The first two items in the block descriptor are sufficient to uniquely address any block in any file referenced by the index file, as will be explained subsequently.

When the Decimation Procedure creates an index file (as described earlier), one of the fields in the index file is reserved for a cache file signature. The value of the cache file signature as initially produced by the Decimation Procedure is zero. Additionally, each file entry contained within the index file has a field reserved for a cache handle, which is also initialized to zero. When the index file is downloaded from the server to the client machine by the web browser, all the mentioned values are still zero. When an index file is inserted into the FSD (as described below), the index file is bound to the cache file by a procedure similar to the following:

Index File to Cache File Binding Procedure—Connects Index File to the Cache File.

1. If the cache file doesn't exist (step 602), create one (step 604). The number of blocks currently in use will be zero, and the cache file signature will be set based on the creation date of the cache file.

2. Read the index file (step 606) and look at its recorded cache file signature (step 608). If it doesn't match the signature of the actual cache file, reset the index file's cache file signature to zero (step 610), and set the cache handle of every file entry contained within the index file to zero. What this situation indicates is that an existing index file is referencing an older cache file, and so the cache info contained within the index file is no longer valid, and must be reset.

3. (step 612) If the cache file signature in the index file is zero (either because it was zero initially or because it was reset in step 2 above), set it to the signature of the actual cache file (step 614).

Binding the index file to the cache file serves to keep the index file and cache file in agreement with respect to the identity of the cache handles. Note that the user can choose to delete the cache file if so desired; any existing index files will then rebind to a new cache file the next time the index file is used to start the target program.

Figure 7:
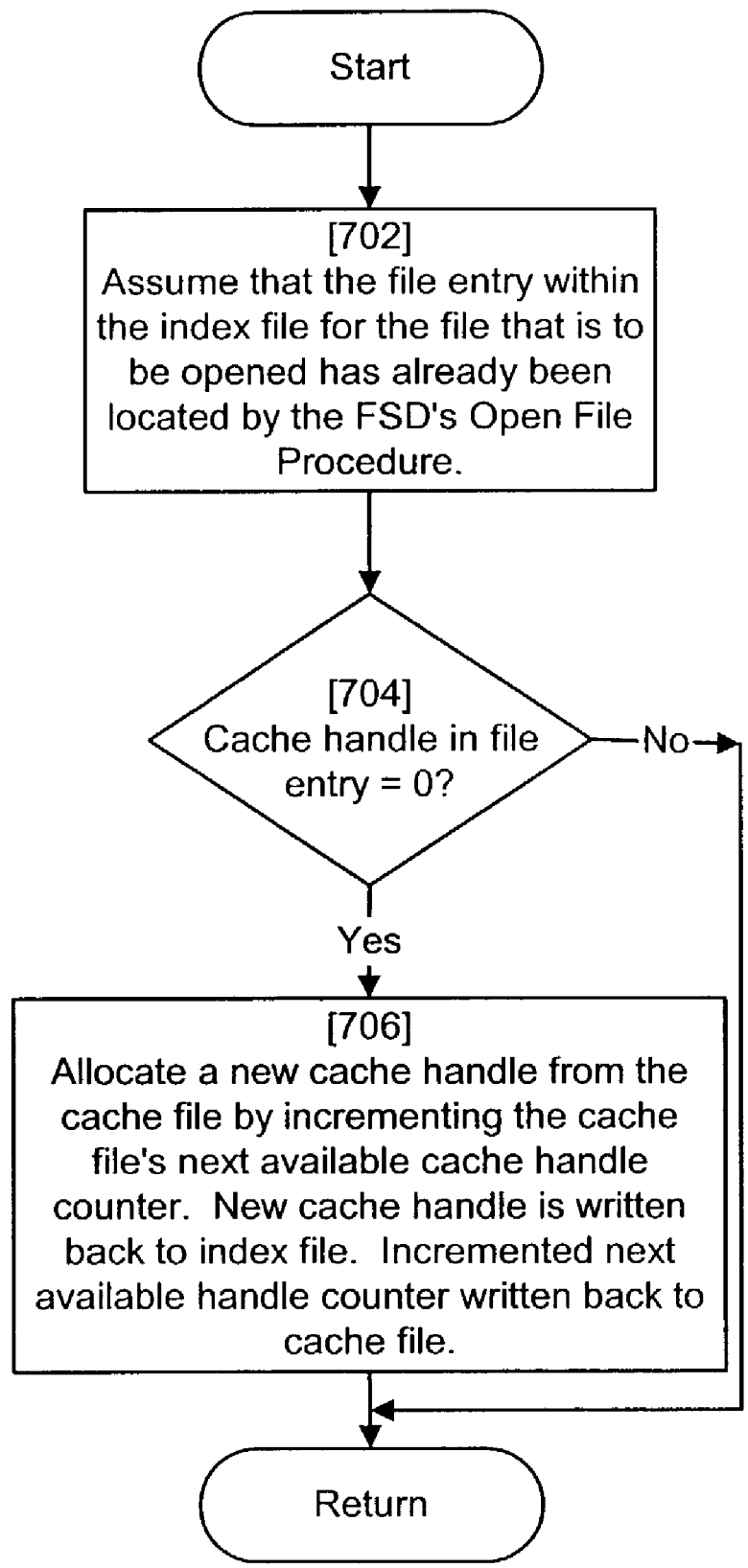
FIG. 7—Flowchart of Set Cache Info during File Open Procedure, showing the steps necessary to link a given file to a cache handle, allowing the file's contents to be cached.

Once a binding has been established between an index file and the cache file, files specified by the index file can be opened (assuming access has been granted by the FSD). The cache processing required when a file is opened can be described by a procedure similar to the following and as illustrated in FIG. 7:

Set Cache Info During File Open Procedure—Handles Cache when a Virtual File is Opened.

1. Assume that the file entry within the index file for the file that is to be opened has already been located by the FSD's Open File Procedure. (step 702)

2. If the cache handle in the located file entry is zero (step 704), allocate a new cache handle from the cache file (step 706). This is done by incrementing the cache file's next available cache handle counter, and using the new value obtained. The cache handle is also written back to the index file on disk, so that it can be used again the next time that index file is used, and the incremented next available cache handle counter is written back out to the cache file. The cache handle uniquely identifies one file. The correspondence between the cache handle and the file within the index file is maintained by the index file, not by the cache file. The cache file just records the next available cache handle to use.

Figure 8A:
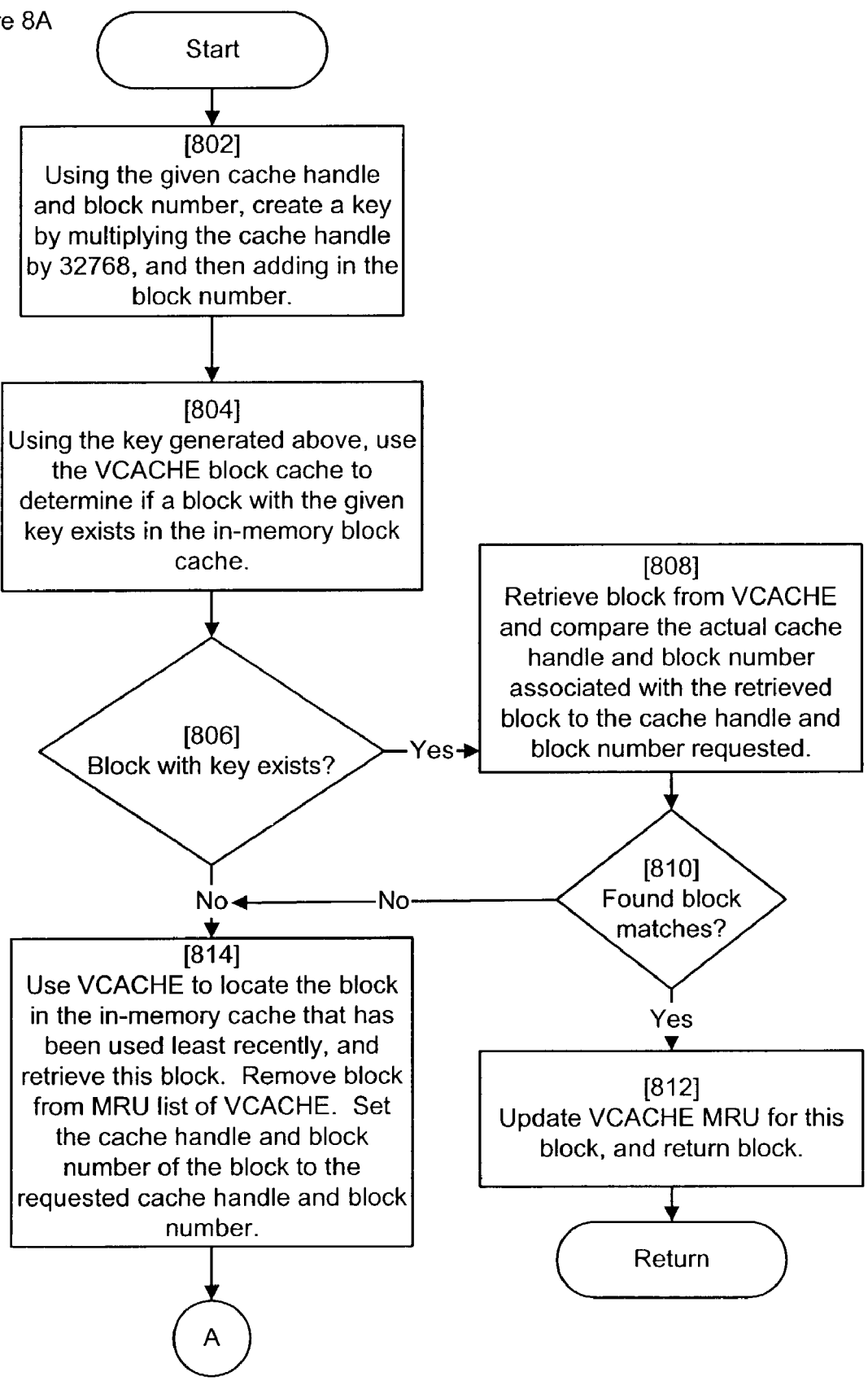
FIGS. 8A to 8C—Flowchart of Retrieve Cache Block Procedure, showing how remote data blocks are migrated from the remote system, to the on-disk cache, to the in-memory cache, and finally used by the system.
Figure 8B:
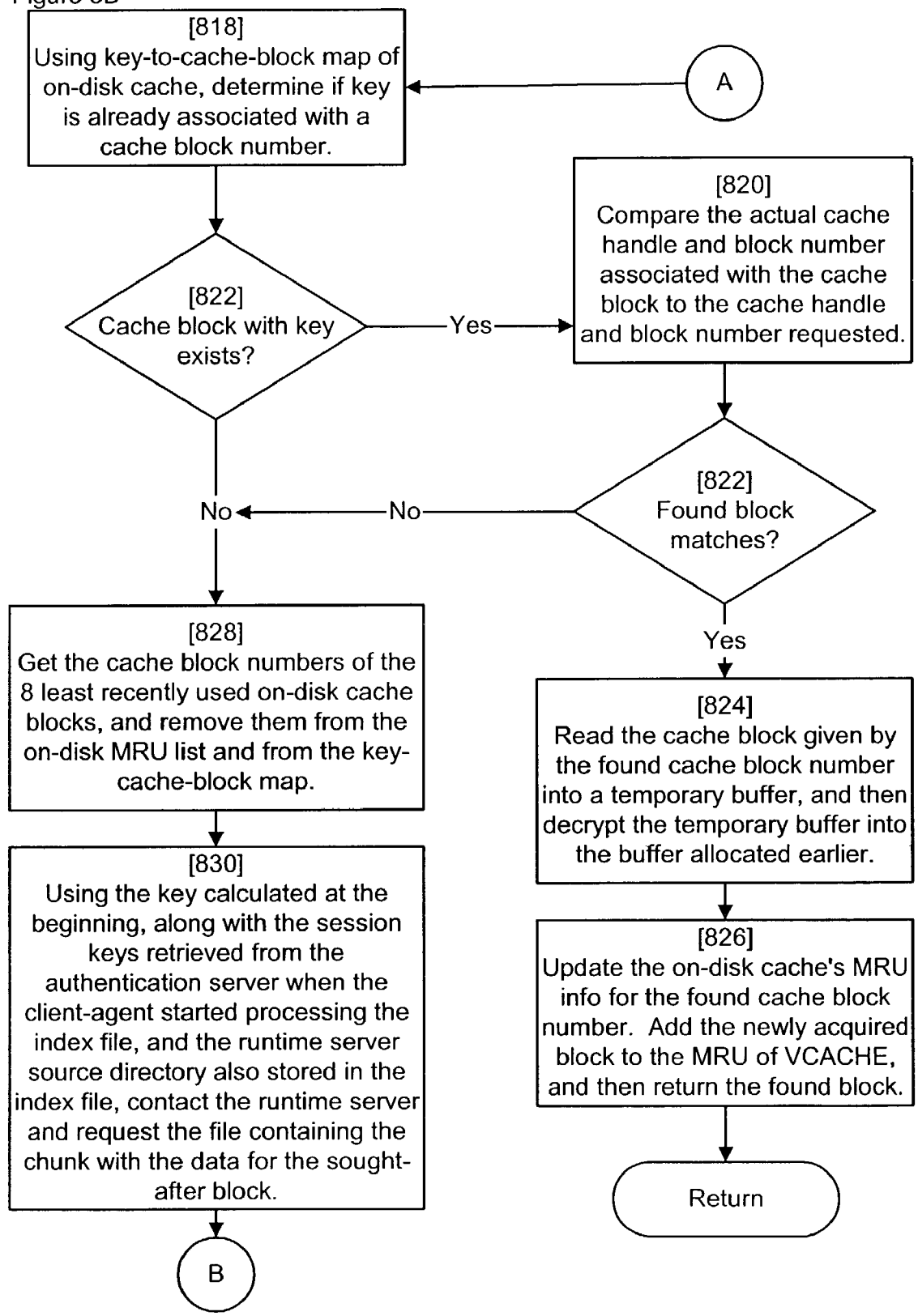
Figure 8C:
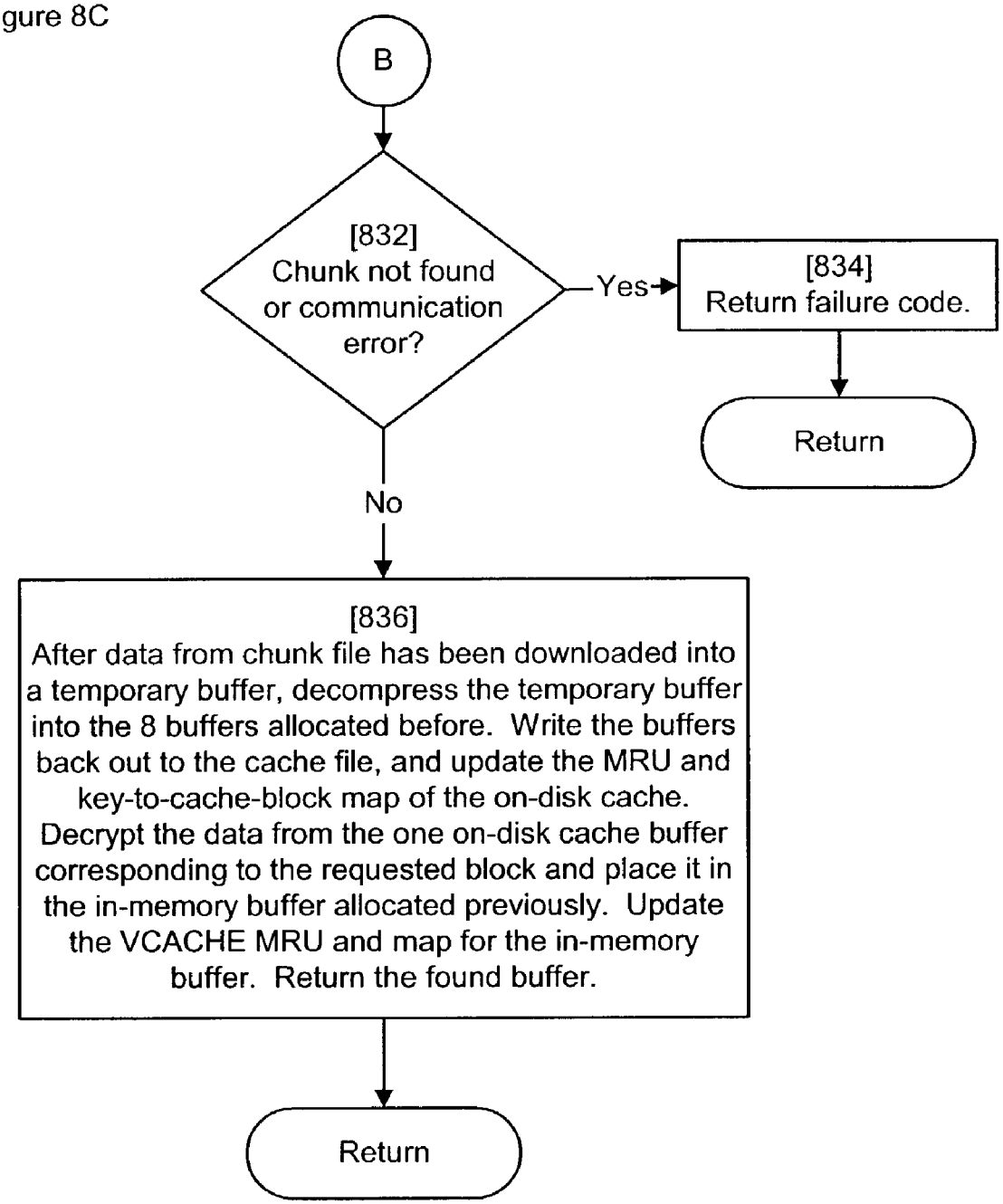

After a cache handle has been associated with a particular file in the index file, the FSD can use the cache handle to retrieve blocks from the cache. The FSD specifies which block to obtain by giving the cache handle of the file, along with the relative block number of which block to retrieve, to a procedure similar to the following as illustrated in FIGS. 8A, 8B and 8C.

Retrieve Cache Block Procedure—Given a Cache Handle and a Block Number, get the Block.

1. Using the given cache handle and block number, create a key by multiplying the cache handle by 32768, and then adding in the block number. (step 802).

2. Using the key generated above, use the VCACHE block cache to determine if a block with the given key exists in the in-memory block cache. (step 804)

3. If a block with the given key exists (step 806), retrieve the block from VCACHE and compare the actual cache handle and block number associated with the retrieved block to the cache handle and block number passed in to this procedure (step 808). If the cache handle and block number match the requested block (step 810), then the block has been found in the in-memory cache. In this case, update the VCACHE MRU info for this block (step 812), and then return the found block. If a block with the given key doesn't exist, or if the cache handle and block number do not match, continue with step 4.

4. (step 814) The requested block is not in the in-memory cache. Use VCACHE to locate the block in the in-memory cache that has been used least recently, and retrieve this block. Remove the block from the MRU list of VCACHE. Set the cache handle and block number of the block to the requested cache handle and block number. An attempt will now be made to retrieve the data for the block from the on-disk cache.

5. The on-disk cache maintains a map from key values to cache block numbers. A cache block number is just an index into the cache blocks stored in the cache file. Using this map, see if the key calculated in step 1 is already associated with a cache block number (step 818). If it is, compare the cache handle and block number associated with the found cache block number to the requested cache handle and block number (step 820) 0. If they match (step 822), we have found the requested block in the on-disk cache. In this case, read the cache block given by the found cache block number into a temporary buffer, and then decrypt the temporary buffer into the buffer allocated in step 4 step 824). Blocks are always stored in the cache file in encrypted form. Update the on-disk cache's MRU info for the found cache block number. Add the newly acquired block to the MRU of VCACHE and then return the found block with its data (step 826). If a cache block number was not in the map for this key, or if the cache handle and block number of the found cache block number did not match the requested cache handle and block number, proceed to step 6.

6. The requested block was not in the on-disk cache as well (step 822). Get the cache block numbers of the 8 least recently used on-disk cache blocks, and remove them from the on-disk MRU list and from the key map. The reason that 8 on-disk cache blocks are allocated is because the block size used by VCACHE and the on-disk cache is 4K, while the chunk files downloaded from the runtime server are 32K in length. Thus, each chunk file downloaded from the runtime server is used to fill 8 on-disk cache buffers. The on-disk cache block numbers just allocated will be used to contain the data downloaded from the runtime server. (step 828)

7. Using the key calculated in step 1, along with the session keys retrieved from the authentication server when the client-agent started processing the index file being used to access this target program, and the runtime server source directory also stored with the index file, contact the runtime server and request the file containing the chunk with the data for the sought-after block. The actual communication protocol used to retrieve the block can be FTP, HTTP, or some other suitable protocol. If the chunk cannot be found, or some other communication error occurs, return a failure code and exit this procedure. (steps 832 and 834) Otherwise, after the data from the chunk file has been downloaded into a temporary buffer, decompress the temporary buffer into the 8 buffers allocated from the on-disk cache in step 6. Write the buffers back out to the cache file, and update the MRU and key map of the on-disk cache. Decrypt the data from the one on-disk cache buffer corresponding to the requested block and place it in the in-memory buffer allocated in step 4. Update the VCACHE MRU and map for the in-memory buffer, and then return the found block. (step 826)

Thus, in general, the search for a request block begins with the in-memory cache. If it isn't in the in-memory cache, the on-disk cache is searched. If it isn't in the on-disk cache, the data is downloaded from the runtime server.

FSD—Controlling Access to the Target Program

Figure 9:
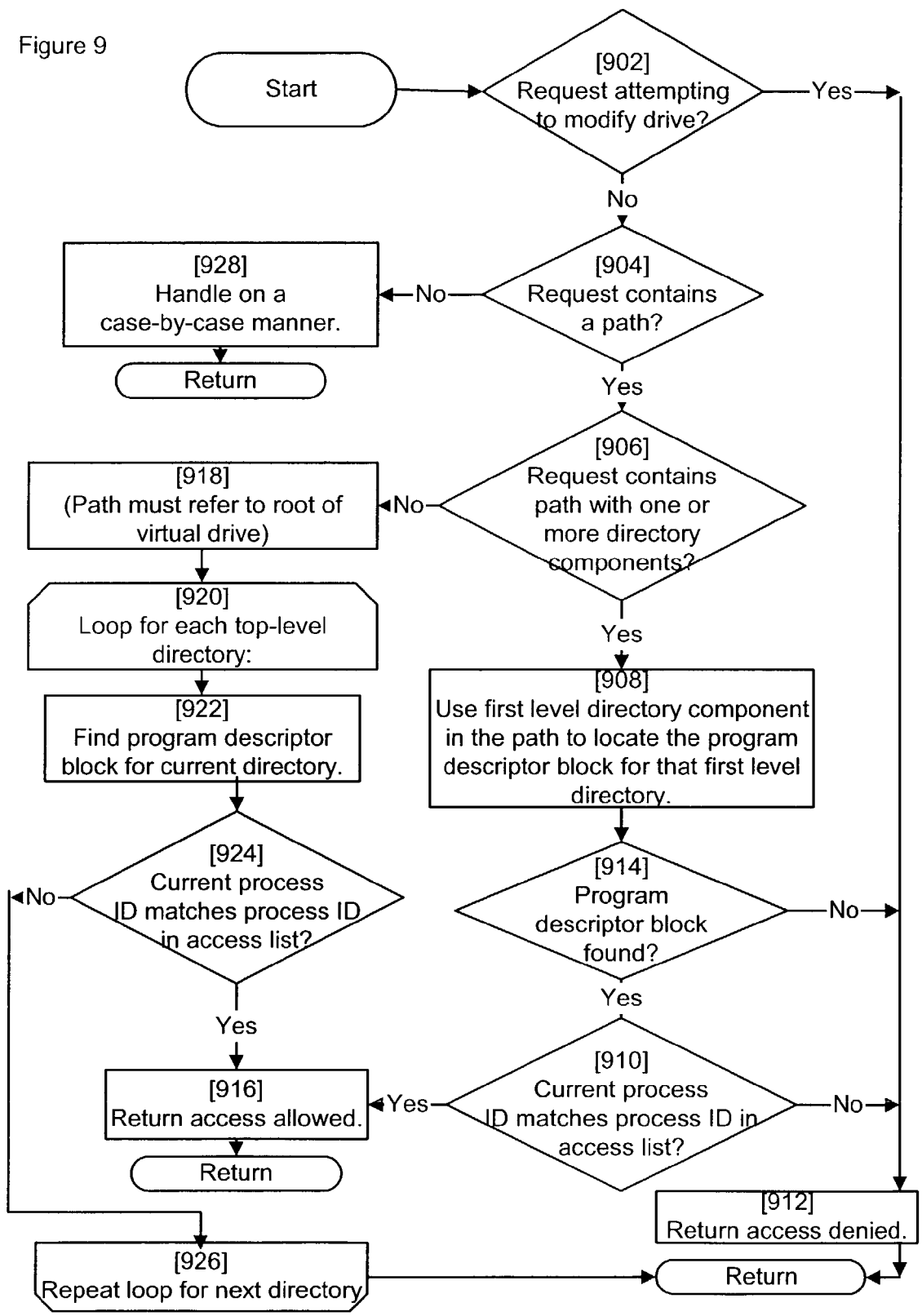
FIG. 9—Flowchart of General Access Control Procedure, showing how access to the virtual directory contents is affected by request type, process ID, and process access lists.

After the target program begins execution, it can begin to access other files on the virtual drive using the volume and file functions provided by the FSD. For the most part, these volume and file functions are similar to those found in any basic network file system. One difference is in how the data for the files is retrieved, which has been explained briefly in the section describing the cache architecture. The other difference is in what any given process can see when it looks at the virtual drive. The general procedure for whether access is granted or not depends on the type of access being requested (i.e. which volume or file function is being executed), the process ID of the process attempting access, and optionally the path specified in the request for those requests containing paths. The general procedure for determining access can be described as in the following procedure (and is illustrated in FIG. 9). Some exceptions to this general procedure will be noted in later sections.

General Access Control Procedure—Performs General Process Access Checks.

1. Since the virtual drive is implemented as a read-only device (an extension to this embodiment includes a write capability), any type of request that attempts to modify the content of the virtual drive is denied access. Examples of these types of requests would be: deleting a file on the virtual drive, renaming a file, opening a file as write-only, attempting to set file attributes, etc. (step 902)

2. For requests that contain a path, and that path has one or more directory components, the first directory component in the path is used to locate the program descriptor block for that first level directory. (steps 904, 906 and 908) If the current process ID associated with the request is not in the process access list in the specified program descriptor block (step 910), access is denied (step 512). If no program descriptor block matches the first directory component (step 914), access is denied (step 912). Otherwise, in general, access is allowed (step 916).

3. For requests that contain a path, but the path is referring to the root of the virtual drive, access will be granted to each top level directory in which the corresponding program descriptor block contains the current process ID in its process access list. An example of this case would be a FS_FindFile request specifying the root of the virtual drive and using a wildcard search. In this case, all top-level directories that allow access to the current process would become visible to the search. (steps 918, 920, 922, 924 and 926)

4. Requests that do not contain a path are handled on a case-by-case manner. (step 928) Some exceptions to this general procedure will now be described on a case-by-case manner, based on the request type:

FS_Dir—Depending on the sub-function requested, the request will be denied if it involves modifying the contents of the virtual drive, and will follow the general procedure above if the request only requires read-only access.

FS_FlushVolume—Allowed for all processes, but ignored.

FS_GetDiskInfo—Allowed for all processes.

FS_QueryResourceInfo—Allowed for all processes.

Figure 10A:
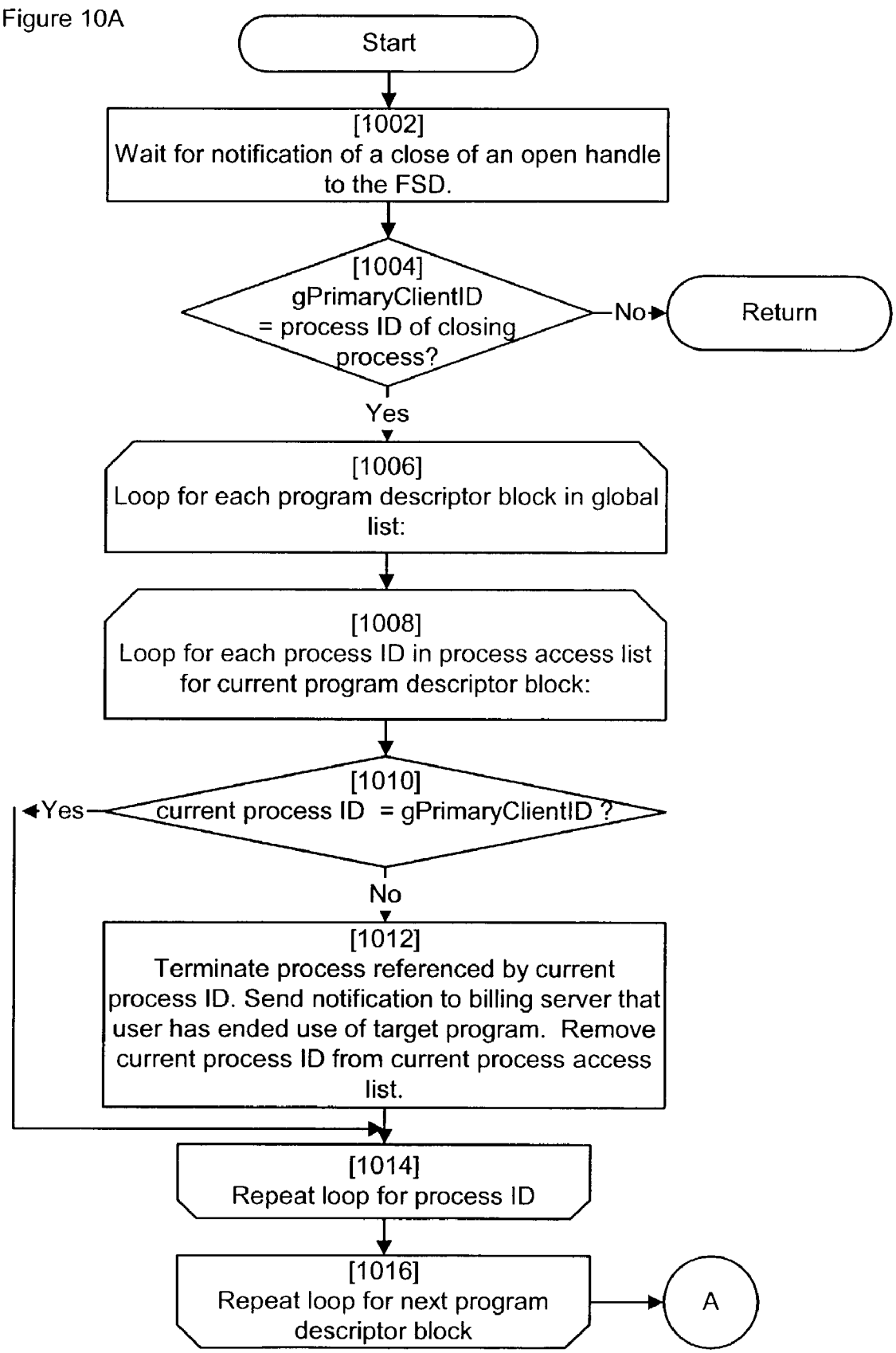
FIGS. 10A and 10B—Flowchart of Primary Client-Agent Deregistration Procedure, showing how the client-agent is shutdown, and all target programs terminated.
Figure 10B:
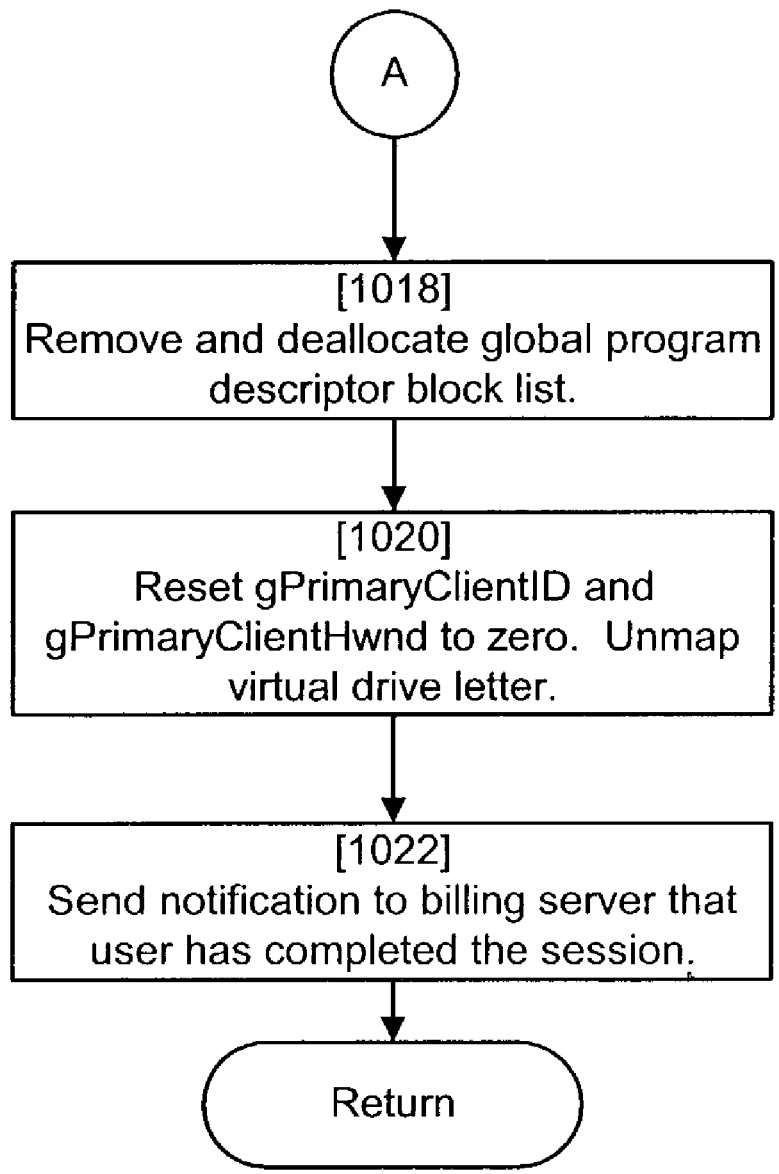

FS_Ioctl16Drive—Allowed for all processes but only for subfunction 0: Get Device Data FSD—Deregistration of Primary Client-Agent When each client-agent begins execution, it opens a handle to the FSD. The FSD is notified whenever a new process opens a handle to it. Likewise, whenever any process with an open handle to the FSD exits, the handle is closed and the FSD is notified of the closure. The FSD uses these notification events to track when the primary client-agent exits. The processing done at the time the primary client-agent exits is similar to the following as illustrated in FIGS. 10A and 10B:

Primary Client-Agent Deregistration Procedure—Deregisters Primary Client-Agent with FSD.

1. Whenever an open handle to the FSD is dosed, the FSD is notified of the closure via its OnW32Devicelocontrol ( ) entry point (step 1002). When such an event is received, the process ID of the process closing its handle to the FSD is compared to g_PrimaryClientID (step 1004).

2. If the two process ID's match, the global list of program descriptor blocks is traversed, and all the process ID's in the process access list (except for the process ID of the primary client-agent) for each program descriptor block are used to terminate all processes thus referenced. The rationale for terminating all processes currently using the FSD is to disallow target programs from running if the primary client-agent is no longer running. If a billing server is being used as part of the intended use of this invention, a notification message is sent to the billing server for each terminated process indicating that the user has ended use of the specified target program. (steps 1006, 1008, 1010, 1012, 1014 and 1016)

3. When each process is terminated, its process ID is removed from the program descriptor block's process access list, and when the list only contains the primary client-agent process ID, the entire program descriptor block is removed and deallocated. (step 1018)

4. The g_PrimaryClientID and g_PrimaryClientHwnd variables are then reset to zero. The drive letter for the virtual drive is unmapped (step 1020). At this point, all processes formerly referencing target programs have all been terminated, and all program descriptor blocks have been removed, thus bringing the FSD back to it's initial empty state.

5. If a billing server is being used as part of the intended use of this invention, a notification message is sent to the billing server indicating that the user has completed the session. (step 1022)

A Specific, Non-Limiting Embodiment

Architecture

The entire architecture revolves around Windows NT Server using the IIS and FTP services. Local machines are preferably Windows 95 (and subsequent releases) and Windows NT machines. Other local machines may also be employed. A high performance database located on the company's server is also required in order to record subscribers, subscriber login times, rental software playing times, and subscriber's high scores on games if applicable.

The company's product preferably uses compression to reduce total number of bytes that have to shipped across the network/modem from the server to a local machine. The product also determines the best way to stream the files downloaded from server to local machine, which allows subscriber to run rental software before entire package is downloaded.

The product preferable uses caching. That is the product leaves some determined amount of files locally on local machine, which allows execution of a "repeat" software rental to occur even faster. Due to files already residing locally, the files don't have to be downloaded again. However, because the header (overhead—beginning of the file) of the main executable file is scrambled (by the company), the subscriber cannot illegally play rental software without using company's client shell.

The product will also take advantage of distributed processing, as rental software could be stored on local premises of intranet, while requiring database-type messages ALWAYS go back to company's server.

Security for the rental software is applied by company, so no illegal use of downloaded rental software can be run without using company's shell client, which then has to be connect somehow to company's server. This process allows company to log subscriber's usage of rental software.

Profiles will be kept about local machines, saving the subscriber the action of installing rental software. This will also allow for machines that perhaps don't have all necessary equipment, like a sound card for example, to be able to still execute the rental software.

Rental Software Preprocessing

In order to arrive at fast delivery times for subscriber, the company scrutinizes the rental software in the following manner:
- a file dependency order is determined and recorded into server database (the client shell will request this information). To arrive at the dependency order, the roam executable of the rental software is copied into a new directory with no other files. This executable is executed, and if an error dialog appears, it will describe the dependency file that the main executable is requiring. That dependency file is copied into the directory with the main executable. The main executable is executed, and again if an error dialog appears, it will state the dependency file it requires. This is performed over and over again, until the main executable actually executes and starts running.
- files get individually compressed.
- main executable and other sensitive files are encrypted (so can't be run illegally on client machines),
- the minimum number of files required for rental software will run is determined (so subscriber does not have to wait for entire package to be downloaded),
- appropriate entries are integrated into company's website so subscriber has ability to select rental software.

Running Rental Software by Company's Product

Potential subscribers visit company's website. Potential subscribers have ability to sign up for unique player name, password, typical form input, as well as credit information.

Once the subscriber account is cleared, the subscriber must download and install company's client shell program. Once completed, subscriber can select any of the rental software packages available at the company's website. Once selection is made, a token file is downloaded to local computer, which executes a single instance of the client shell program. If subscriber has not logged on yet, the client shell presents a login dialog box appears on the local machine in order for subscriber to enter unique playername and password (to login).

This information is formatted into a message and sent to company's website. The playername and password is validated. Also a check is performed to see if account has been disabled. Another check is made to see if playername is already in use; this prevents someone from sharing/loaning their playername to someone else to enjoy the company's product.

A unique session ID is generated and returned back to the client shell.

Client shell decodes the token file, and determines gamename which is one of the elements of token file.

The client shell issues a message with this gamename; the database returns a "stream" string. This is a string with the rental software dependencies listed in order, also included is a number that will tell the client shell the minimum number of files that need to be downloaded before execution.

The client shell parses the stream string, and starts fliping the files in order down to the local machine. Files are uncompressed and written to the local hard disk in relative order as on original CD. Because the rental software has been previously encrypted, the rental software even though has been written to the local machine's hard disk, will not be able to be executed any other way (command line, network neighborhood, etc.) except form the company's client shell software. When minimum number of files have been downloaded, the client executes the rental software as a new process.

Once rental software is running, the client shell sends a "start-time" message to server database in order to log subscriber usage. The client shell continues to download rest of rental software package as a background task. However, if subscriber selects an option in software rental that requires a file not yet local or downloaded, the rental software execution is suspended, while client shell downloads file from company's website, then allows rental software to resume execution.

When rental software terminates for any reason, purposely by subscriber or by rental software crash, a message is sent to database to record when rental software had ended playing. This accurately tracks subscriber usage, which is crucial to company's billing policy.

If rental software is some kind of game, high scores are sent to database also.

Subscriber can logout at any point. In this case, the client shell formats a message to logout subscriber out from service.

Background

People now generally purchase their software programs. This leads to substantial money outlay for a person. Installation generally has to be performed by purchaser which can be time consuming and often becomes a frustrating process. The company's product alleviates these issues as subscribers can rent software and rental software is already pre-configured so there is minimum to no installation issues for the subscriber.

If a person finds software on the internet or bulletin board, he or she must follow current download methods which includes downloading entire zipped file, which then subscriber must unzip, and install, requiring minutes to accomplish this. Execution does not occur until zipped file or the entire set of files is downloaded to local machine.

Piracy looms large in the software industry, it is fairly easy to copy and install from floppies and CDs multiple times. Since the company is vulnerable to downloading rental software to subscriber's local machine, there is an encryption process involved with this product so illegal use of the rental software is not possible. The company's product therefore provides more security towards a software package then current methods of purchasing floppies and CDs.

Streaming

The company has developed a streaming technology in order for the rental software to be executed before entire set of rental software files are downloaded to subscriber's machine. Otherwise, subscriber has to download entire set of files before running rental software; we have determined a way to run this rental software before entire set has been downloaded. This usually means subscriber can run program up to 3–5 times faster.

The company uses a manual approach currently to determine streaming:
  Records files used by rental software in order
  Executable files and any other deemed-sensitive files are encrypted. This encryption prevents the subscriber from running the rental software illegally, which means when not connected to the company's server, or any other hacking or devient intentions subscriber may try.
  These files are compressed and copied to company's server with relative directory paths maintained. Compressed files take less to download from company's server to subscriber's local machine.
  A string is created of this dependency order and inserted into the database. This allows client shell to query for this string, and then download the appropriate files in order. Again this allows the rental software to be able to be run before entire package is downloaded.
  A token file is created for the webpage object and copied to the companies server. This token gets activated when subscriber clicks on company's webpage, http'ed down to local machine, and passed to client shell program. This mechanism allows the client shell to determine what software rental package the subscriber just selected on from the webpage.

This process is expected to be converted to a software program in the future.

Encryption

The company uses an encryption technique to prevent subscribers from running rental software while not connected to company s server. This includes not allowing the subscriber to copy or run rental software if an ungraceful disconnect occurs between subscriber and company website. This includes if subscriber intentionally disconnects from company server or if any crashes occur, etc. There is very little right now to prevent any purchaser of software from illegal copying of software from floppies or CDs. The company feels very secure in its technology to protect the company's rental software clients, as wells as correctly and accurately representing the revenue generated while using company's product.

For best performance, a minimum set of files are encrypted. This is because performance will be impacted for every decryption action performed by the client shell. The company right now will just decrypt the main executable file. If a rental software client deems more than this lone file to be encrypted, the company can easily meet these requirements.

If files other than the executable need to be decrypted, the client shell will decrypt as the file is downloaded to local machine. The main executable program file will be decrypted in memory just prior to program execution. If files are written to local hard disk unencrypted, rental software protection is compromised.

Caching

For performance of this product, various levels of local computer caching is utilized. If all files of rental software is left on local computer, after subscriber is finished playing, then performance can be increased if subscriber plays rental software package again. If the client shell determines if next required file is already resident on local machine, then file does not need to be downloaded, uncompressed, and decrypted then performance is increased.

If the local machine does not have adequate resources, then files have to deleted from local machine.

Rental Software Suspension

One of the advantage's to this company's invention is to allow client shell to execute rental software before all the files are downloaded to local machine. The rental software is executed once the minimum number of files are downloaded. The client shell continues to download files as a background task while rental software is executing. If, however, the rental software "needs" a file that is not yet downloaded, the client shell traps the error message and parses out the filename that is needed or missing.

This is done by making the client shell look like a debugger. This means when client shell calls the Win32 API CreateProcess( ) to start executing the rental software, it uses a debugging property, so when an error occurs in the rental software (like a missing file), the error is trapped by the client shell which then can download the appropriate file from the server.

Billing Policies

Billing of subscribers is accomplished in several different methods. The company will have a monthly subscription rate, an hourly rate, and per-game instance rate.

The company has devised methods in order to accurately track subscriber's usage of each rental software package. Rental software usage is tracked on a per second basis from all subscribers. Revenues from the company are split based on rental software usage. The more seconds the rental software "acquires" (from subscribers running that package), the more revenue the rental software developer will receive.

When a subscriber selects a rental software package, a login dialog appears on subscriber's local machine. The subscriber enters a valid playername and password combination. The client sends this information back to database, and combination is validated. A unique session ID is generated, and start login time is recorded into database. Assuming subscriber enters valid combination, the subscribers is ready to select any rental software package. Once a software rental package is selected, the client shells starts downloading appropriate files. Once the minimum set of files are resident on local machine, the rental software is executed/run. A game session start time message is sent up to database. If rental software terminates for any reason, the stop time message is sent up to database. This accurately tracks subscription usages for revenue distribution to rental software clients.

The client shell allows subscriber to logout at any time, which generates a logout message back to database.

Intranet Support

The product will support an Intranet-type network, this means that all database queries and logging messages are sent only to the company's database, but the rental software is stored on a different site's FTP server. This allows for even faster download and execution time as the files are transferred at LAN (Ethernet or Token Ring) speeds, but database messages can use a slower modem or ISDN rate to communicate with company's server.

Message Structure of IIS Extensions

These ISAPI extensions reside in the company's .dll file which reside on the http server. This .dll interfaces to company's database, and are called by the client shell in order to record or query data to and from the database. The client shell creates an HTTP string with the following members. The .dll returns an HTTP string with either error message or appropriate return argument. The message protocol is HTTP over TCP/IP.

The follow method is called to create and update subscriber's personal profile in company's database.

LoadMemberBilling(LPCTSTR player_name,
   LPCTSTR password,
   LPCTSTR firstname,
   LPCTSTR lastname,
   LPCTSTR streetaddress,
   LPCTSTR city,
   LPCTSTR state,
   LPCTSTR zip,
   LPCTSTR country,
   LPCTSTR ccnumber,
   LPCTSTR ocexpdate,
   LPCTSTR name_on cc,
   LPCTSTR tele,
   LPCTSTR fax,
   LPCTSTR email);
   The message:
   LogontoGWserver(LPCTSTR username, LPCTSTR password);
      returns sessionID is called by client shell after subscriber enters valid playername and password. The database is checked for these two items, as well as if account is deactivated, or if account is already logged on.
   The message:
   GetGameStream(LPCTSTR gametitle);
      returns dependencystring is called by client shell to retrieve file dependency string and minimum number of files required for main executable to start executing. This gets called after subscriber selects particular rental software from website.
   StartGameClock(LPCTSTR sessionID, LPCTSTR gametitle, LPCTSTR, playername);
      returns gameID is called by client shell when minimum number of files have been downloaded to local machine and rental software start executing.
   StopGameClock(LPCTSTR sessionID, LPCTSTR gameID);

is called when rental software terminates.

The client shell calls,
   LogoffGWserver(LPCTSTR sessionID);

to logoff subscriber. Time of each subscriber logon is tracked in database.
   LogErrorsMsg(LPCTSTR errormsg)

is called when issues and errors need to be recorded in company's database.

The client shell calls
   Record_High_Scored(LPCTSTR gameID, LPCTSTR playername, LONG gamescore)

to record high score of subscriber's high score.

Organization of Database

| Error_Messages Table | |
| --- | --- |
| ID | number |
| Timestamp | Date/Time |
| Error | text |

| Game_High_Scores Table | |
| --- | --- |
| Game Id | text |
| Player Name | text |
| High Score 1 | number |
| High Score 2 | number |
| High Score 3 | number |
| High Score 4 | number |
| High Score 5 | number |

| Game_ID Table | |
| --- | --- |
| Unique Game | text |
| Game Name | text |
| Stream | text |

| Game_Usage Table | |
| --- | --- |
| Unique Session | text |
| Player Name | text |
| Unique Game | text |
| Game Start Time | date/time |
| Game Stop Time | date/time |
| Elapsed Time | number (in seconds) |

| Member_Billing Table | |
| --- | --- |
| Player Name | text |
| password | text |
| disabled? | Binary yes/no |
| already logged on? | Binary yes/no |
| Activation Date | date/time |
| Deactivation Date | date/time |
| First Name | text |
| Last Name | text |
| Street Address | text |
| City | text |
| State | text |
| zip code | text |
| Country | text |
| Credit Card Number | number |
| Credit Card Expiration Date | date/time |
| Name on Credit Card | text |
| telephone number | text |
| fax number | text |
| email address | text |

| Member_Mktg_Info Table | |
| --- | --- |
| Player Name | text |
| Age | number |
| Education Level | number |
| Occupation | text |
| Income level | number |
| Sex | text |
| Internet hours | number |
| Preferred Game | text |
| Magazine 1 | text |
| Magazine 2 | text |
| Magazine 3 | text |
| Magazine 4 | text |

| Service_Usage Table | |
| --- | --- |
| Unique Session | text |
| Player Name | text |
| Login Time | date/time |
| Logout Time | date/time |
| Elapsed Time | number (seconds) |
| IP_addr | text |

What is claimed is:

1. A system comprising:
a processor;
memory, coupled to the processor, with modules stored therein, the modules including:
a target process associated with a streaming target program;
a network file system driver for facilitating access for an agent procedure to software-on-demand file resources associated with the streaming target program, wherein the software-on-demand file resources reside on a remote software-on-demand file server; and
a subset of the software-on-demand file resources associated with the streaming target program, including at least one executable file resource,
wherein the processor generates the agent procedure to demand a software-on-demand file resource associated with the target program from the remote software-on-demand file server using the network file system driver, wherein the processor executes the at least one executable file resource to run the target process, and wherein the agent procedure uses data to uniquely identify the software-on-demand file resource.

2. The system of claim 1, wherein the memory further includes a local security process that, when executed by the processor, regulates access of the software-on-demand file resources by the agent procedure based on a property that is unique to the target process, wherein the unique property facilitates demanding the software-on-demand file resources by the agent procedure on behalf of the target process.

3. The system of claim 1, further comprising a database including one or more data selected from the group consisting of a session ID, a user ID, a file ID, a stream ID, and a password, wherein the data used by the agent procedure uses data from the database to uniquely identify the software-on-demand file resource.

4. The system of claim 1, wherein the agent procedure is accessing at least some of the software-on-demand file resources across the network.

5. The system of claim 1, wherein the agent procedure is accessing the subset of the software-on-demand file resources locally.

6. The system of claim 1, wherein the network files system driver communicates with the remote software-on-demand file server on behalf of the agent procedure.

7. The system of claim 1, wherein the software-on-demand file resources are arranged in a directory.

8. The system of claim 1, wherein a local disk cache includes an on-demand-file resource that is associated with the target process.

9. A computer-implemented method comprising:
obtaining access to a group of blocks associated with a streaming program in a file system structure;
sending a message to a streaming server to provide a stream string associated with the streaming program;
receiving the stream string, the stream string including a block of the group of blocks associated with the streaming program;
parsing the stream string;
executing the parsed stream string to run the streaming program when a first subset of the group of blocks associated with the streaming program have been received;
interrupting execution of the streaming program if a block associated with the streaming program is unavailable;
resuming execution of the streaming program when the unavailable block becomes available.

10. The method of claim 9, further comprising selecting the streaming program at a website.

11. The method of claim 9, further comprising:
downloading a token file associated with the streaming program;
decoding the token file to identify the streaming program.

12. The method of claim 9, further comprising:
receiving a second subset of the group of blocks associated with the streaming program as a background process;
executing the second subset of the blocks when needed.

13. The method of claim 9 further comprising requesting from the streaming server the block associated with the streaming program.

14. The method of claim 9 further comprising accessing file resources on behalf of a target process associated with the streaming program.

15. The method of claim 14 further comprising regulating access of file resources based on a property that is unique to the target process.

16. A system comprising:
a software-on-demand server program executing on a server computer including a directory of blocks for on-demand provisioning to a client computer, authentication logic configured to determine whether a client process associated with the client computer is authorized to access the blocks at a specific time, and access logic configured to enable access to the blocks associated with a software title uniquely identified by the client process;
a file system driver program executing on the client computer including:
one or more agent procedures executing on the client computer to access file resources on behalf of a target process executing on the client computer, wherein the target process is associated with a virtual directory structure on the client computer that includes a subset of the blocks in said directory of blocks for on-demand provisioning; and a security process executing on the client computer that regulates the access of the file resources by the agent procedures, wherein the security process regulates the access of the file resources by the agent procedures based on a property that is unique to the target process such that the agent procedures can access the file resources on behalf of the target process and wherein, of processes executing on the client computer, the file resources are visible only to the agent procedures and the target process.

17. The system of claim 16, wherein the file system driver program further includes an identification process by which the agent procedures identify to the security process a property that is unique to the target process.

18. The system of claim 16, wherein the agent procedures can access at least some of the file resources across the network.

19. The system of claim 16, wherein the agent procedures can access at least some of the file resources at the client computer.

20. The system of claim 16, wherein the file resources include portions of the target process held in a disk cache on the client computer.

21. The system of claim 16, wherein the file resources include encrypted portions of the target process, and wherein the file system driver program includes a decryption procedure effective to decrypt the encrypted portions of the target process.

22. The system of claim 16, wherein the file system driver program regulates access to the agent procedures themselves.

23. The system of claim 16, wherein the file system driver program includes at least one of: password checking procedures; execution counters; and timeout procedures.

24. The system of claim 16, wherein at least a portion of the file resources to which access is regulated by the security process collectively constitute a target process, and at least one client agent procedure reconfigures the environment of the client computer for execution of the target process.

25. The system of claim 16, wherein a client agent procedure is effective to reconfigure the environment of the client computer based on a reconfiguration database.

26. The system of claim 16, wherein a client agent procedure is effective to reconfigure the environment of the client computer based on the environment of the client computer before executing the target process.

27. The system of claim 16, wherein a client agent procedure restores the environment of the client computer to the environment of the client computer before executing the target process.

28. The system of claim 16, further comprising: an administrative program executing on a computer other than the client computer, wherein said file system driver program is effective to operate at least in part upon data received from the administrative program to regulate access to the access procedures.

29. The system of claim 16, wherein the security process regulates access of the file resources by the agent procedures without regard to properties of the file resources themselves.

30. The system of claim 16, wherein during one access of the file resources by a particular agent procedure, a decision is made whether to grant access to the file resources by the particular agent procedure, and subsequent accesses of the file resources by the particular agent procedure are based on the decision.

31. The system of claim 16, wherein the security process regulates the access of the file resources by the agent procedures based on a property that is unique to the target process, wherein the property that is unique to the target process includes a property selected from the group consisting of a session ID, a user ID, an IP address, a password, a game ID, or some combination of properties that together are unique to the target process.

32. The system of claim 16, wherein the security process regulates the access of the file resources by the agent procedures based on a property that is unique to the target process, wherein the property that is unique to the target process includes a plurality of sub- properties.

33. The system of claim 16, wherein the security process regulates the access of the file resources by the agent procedures based on a property that is unique to the target process, the client computer that regulates the access of the file resources by the agent procedures further regulates access based on a number of non-unique properties.

34. The system of claim 16, wherein the security process regulates the access of the file resources by the agent procedures based on a property that is unique to the target process, wherein the property that is unique to the target process is used to determine one or more of the file resources to which the agent procedures are given access.

35. The system of claim 16, wherein the security process regulates the access of the file resources by the agent procedures based on a property that is unique to the target process, wherein the property that is unique to the target process is used to determine one or more of the file resources to which the target process is given access.

36. The system of claim 16, wherein a reconfiguration database is generated by: recording an original environment of a testbed computer system; installing the target process on the testbed computer system; determining differences between the original environment of the testbed computer system and the environment of the testbed computer system after installing the target process; and generating the reconfiguration database based on the determined differences.

37. The system of claim 36, wherein generating the reconfiguration database includes executing the target process on the testbed computer.

38. The system of claim 36, wherein determining differences between the original environment and the environment after installing the target process includes determining a difference in files stored on the testbed computer system.

39. The system of claim 36, wherein:
  determining differences between the original environment and the environment after installing the target process includes determining a difference in files stored on the testbed computer system, and wherein
  generating the reconfiguration database based on the determined differences includes recording in the reconfiguration database an indication of the files stored on the testbed computer system determined to be different.

40. A computer including a processor and a computer-readable medium for storing data and executable code, comprising:
  one or more agent procedures executing on a local computer to access file resources associated with a streaming program on behalf of a target process on the local computer;
  a client shell, executing on the local computer, that includes a process effective to trap and dispose of in the client shell a missing file error if one of the agent procedures attempts to access one of the file resources when the file resource is needed by the target process but is locally unavailable, wherein the target process is executable within the client shell.

41. A computer-implemented method comprising:

receiving a file dependency list, the file dependency list identifying one or more blocks of a group of blocks associated with a streaming program;

requesting the one or more blocks identified in the file dependency list;

receiving the one or more blocks identified in the file dependency list;

executing the streaming program when the one or more blocks have been received;

interrupting execution of the streaming program if a block associated with the streaming program is unavailable;

resuming execution of the streaming program when the requested block becomes available.

42. The method of claim 41 further comprising obtaining access to the group of blocks associated with the streaming program in a file system structure.

43. The method of claim 41 further requesting the file dependency list from a streaming server.

44. A system comprising:

a means for receiving a file dependency list, the file dependency list identifying one or more blocks of a group of blocks associated with a streaming program;

a means for requesting the one or more blocks identified in the file dependency list;

a means for receiving the one or more blocks identified in the file dependency list;

a means for executing the streaming program when the one or more blocks have been received;

a means for interrupting execution of the streaming program if a block associated with the streaming program is unavailable;

a means for resuming execution of the streaming program when the requested block becomes available.

45. The system of claim 44 further comprising a means for obtaining access to the group of blocks associated with the streaming program in a file system structure.

46. The system of claim 44 further comprising a means for requesting the file dependency list from a streaming server.

* * * * *